US010983611B2

(12) United States Patent
Drumm

(10) Patent No.: US 10,983,611 B2
(45) Date of Patent: Apr. 20, 2021

(54) STYLUS WITH A CONTROL

(71) Applicant: Beechrock, Castletown (IM)

(72) Inventor: Owen Drumm, Dublin (IE)

(73) Assignee: Beechrock Limited, Castletown (IM)

( * ) Notice: Subject to any disclaimer, the term of this patent is extended or adjusted under 35 U.S.C. 154(b) by 0 days.

(21) Appl. No.: 16/433,935

(22) Filed: Jun. 6, 2019

(65) Prior Publication Data

US 2019/0377431 A1 Dec. 12, 2019

Related U.S. Application Data

(60) Provisional application No. 62/681,472, filed on Jun. 6, 2018.

(51) Int. Cl.
*G06F 3/0354* (2013.01)
*G06F 3/042* (2006.01)
*G06F 3/038* (2013.01)

(52) U.S. Cl.
CPC ........ *G06F 3/03545* (2013.01); *G06F 3/0386* (2013.01); *G06F 3/042* (2013.01)

(58) Field of Classification Search
CPC ..... G06F 3/03545; G06F 3/0386; G06F 3/042
USPC .......................................................... 345/179
See application file for complete search history.

(56) References Cited

U.S. PATENT DOCUMENTS

| | | | | |
|---|---|---|---|---|
| 6,498,602 | B1 * | 12/2002 | Ogawa ................ | G06F 3/03545 178/18.01 |
| 6,876,356 | B2 | 4/2005 | Zloter et al. | |
| 9,965,101 | B2 | 5/2018 | Drumm et al. | |
| 2001/0012002 | A1 | 8/2001 | Tosaya | |
| 2002/0015159 | A1 * | 2/2002 | Hashimoto ........... | G06F 3/0421 356/620 |
| 2006/0001654 | A1 | 1/2006 | Smits | |
| 2008/0166048 | A1 | 7/2008 | Raif et al. | |
| 2008/0259053 | A1 | 10/2008 | Newton | |
| 2009/0146992 | A1 * | 6/2009 | Fukunaga ........... | G02F 1/13338 345/214 |
| 2009/0167728 | A1 | 7/2009 | Geaghan et al. | |
| 2011/0181552 | A1 | 7/2011 | Goertz et al. | |
| 2013/0285977 | A1 | 10/2013 | Baharav et al. | |
| 2014/0098058 | A1 | 4/2014 | Baharav et al. | |

(Continued)

FOREIGN PATENT DOCUMENTS

KR 20170035305 A * 3/2017

OTHER PUBLICATIONS

PCT International Search Report and Written Opinion, PCT Application No. PCT/IB2019/000110, dated Jun. 17, 2019, 13 pages.

*Primary Examiner* — Mark Edwards
(74) *Attorney, Agent, or Firm* — Fenwick & West LLP

(57) ABSTRACT

A touch sensitive surface has emitters and detectors arranged around at least a portion of a periphery of the touch sensitive surface. The emitters produce optical beams that are received by the detectors. Touch events disturb the beams propagating toward the detectors. Variations in the beams resulting from the touch events are captured and are used to determine the touch events. A stylus disturbs beams when in contact with the touch sensitive surface. The stylus includes a control that can change the stylus from a default state to an alternative state, where the stylus disturbs the beams differently in each state. A controller determines the state of the stylus based on the beams received by the detectors.

18 Claims, 19 Drawing Sheets

(56) References Cited

U.S. PATENT DOCUMENTS

| | | | | |
|---|---|---|---|---|
| 2014/0152624 | A1 | 6/2014 | Piot et al. | |
| 2014/0168142 | A1 | 6/2014 | Sasselli et al. | |
| 2014/0267180 | A1* | 9/2014 | Buelow | G06F 3/044 345/179 |
| 2015/0286293 | A1 | 10/2015 | Gruhlke et al. | |
| 2015/0309662 | A1* | 10/2015 | Wyrwas | G06F 3/042 345/175 |
| 2016/0170563 | A1 | 6/2016 | Drumm | |
| 2018/0136747 | A1 | 5/2018 | Keam et al. | |
| 2018/0267671 | A1 | 9/2018 | Lee et al. | |

* cited by examiner

STYLUS WITH A CONTROL

CROSS REFERENCE TO RELATED APPLICATIONS

This application claims the benefit of priority to U.S. Provisional Patent Application No. 62/681,472, "Passive Pen (Instrument) with Button," filed on Jun. 6, 2018, which is incorporated by reference.

BACKGROUND

1. Field of Art

This description generally relates to a stylus interacting with a surface of touch-sensitive device, and specifically to a stylus configured to disturb optical beams in different manners based on a state of the stylus.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

While touch objects are generally fingers, solutions exist to support detection of other touch objects types, such as styli. However, styli without electronics only offer a single operating mode when interacting with the touch system. This can limit the functionality of the stylus and the touch system. Some existing styli with electronic components offer multiple operating modes. However, the approaches adopted to providing multiple modes add complexity, bulk, and cost. For example, a stylus may include additional electronics to actively communicate with the touch system via Wi-Fi, Bluetooth, or some other wireless communication channel. Furthermore, the requirement to regularly replace batteries can be a cause for user frustration and additional expense.

SUMMARY

An optical touch-sensitive device may determine the locations of touch events. The optical touch-sensitive device includes multiple emitters and detectors. Each emitter produces optical radiant energy which is received by the detectors. In some embodiments, the optical emitters are frequency or code-division multiplexed in a manner so that many optical sources can be received by a detector simultaneously. Alternatively, emitters are time multiplexed and are activated sequentially in a predefined sequence. Touch events disturb the optical energy transfer from emitter to detector. Variations in light transfer resulting from the touch events are captured, and are used to determine the touch events. In one aspect, information indicating which emitter-detector pairs have been disturbed by touch events is received. The light disturbance for each pair is characterized and used to determine the beams attenuation resulting from the touch events.

The emitters and detectors may be interleaved around the periphery of the sensitive surface. In other embodiments, the number of emitters and detectors are different and are distributed around the periphery in a defined order. The emitters and detectors may be regularly or irregularly spaced. In some cases, the emitters and/or detectors may be located on less than all of the sides (e.g., one side). Reflectors may also be positioned around the periphery to reflect optical beams, causing the path from the emitter to the detector to pass across the surface more than once. For each emitter-detector pair, a beam is defined by combining light rays propagating from an emitter and a detector. In some implementations, the disturbance of a beam is characterized by its transmission coefficient, and the beam attenuation is determined from the transmission coefficient.

Some embodiments relate to a system including a touch sensitive surface, emitters, detectors, a stylus, and a controller. The emitters produce optical beams that propagate across the touch sensitive surface and are received by the detectors. The stylus disturbs a portion of the optical beams when in contact with the touch sensitive surface. The stylus includes a control that can change the stylus between first state and a second state. The stylus disturbs the portion of the optical beams differently in the second state than the first state. The controller determines the state of the stylus based on optical beams received by the detectors.

Alternative embodiments relate to a stylus that can contact a touch sensitive surface of a touch system. The touch system has emitters and detectors. The emitters produce optical beams that propagate across the touch sensitive surface and are received by the detectors. The stylus disturbs a portion of the optical beams when in contact with the touch sensitive surface. The stylus has a control that can change the stylus between a first state and a second state. The stylus disturbs the portion of the optical beams in a different manner in the second state than the first state such that the touch system can determine the state of the stylus.

In some embodiments, the stylus is a passive stylus.

In some embodiments, the control includes at least one of: a button, a switch, a lever, a rotary dial, a band, a rotating section of a body of the stylus, a roller, or a slider.

In some embodiments, the stylus includes a tip and a sleeve. The tip disturbs the portion of the optical beams in the first state. The sleeve surrounds the tip when the control is activated to change the stylus to the second state.

In some embodiments, the first state and the second state are the only two states of the stylus.

In some embodiments, the first state and the second state are states in a set of three or more states. The control can change the stylus to one of the three or more states that include the first state and the second state.

In some embodiments, the stylus includes a hollow tip and a plunger. The tip disturbs the portion of the optical beams when the tip is in contact with the touch sensitive surface. When the stylus is in the second state, the plunger is coupled to an internal surface of the tip. In some embodiments, the plunger conforms to the internal surface of the tip in the second state. In some embodiments, the tip includes transmissive or partially transmissive material. At least some disturbed beams are coupled into the tip when the tip is in contact with the touch sensitive surface. In some embodiments, the plunger includes material the absorbs or attenuates optical beams incident on the plunger. In some embodiments, the internal surface of the tip comprises a relief pattern. In some embodiments, the relief pattern includes light absorbing material. In some embodiments, the relief pattern includes repeating structures.

In some embodiments, the stylus includes a reflector. In the second state the portion of the optical beams are disturbed such that a disturbed optical beam is reflected by the reflector towards a detector.

In some embodiments, the stylus includes a wavelength filter. At least some of the portion of optical beams are filtered by the wavelength filter in the second state such that a disturbed optical beam has a wavelength spectrum different than a wavelength spectrum of the optical beam when it was emitted from an emitter.

In some embodiments, the stylus includes a polarizer and at least some of the disturbed beams are polarized by the polarizer in the second state.

In some embodiments, the stylus includes two gratings that are aligned. The gratings are aligned differently in the first and second states such that disturbed beams are disturbed in the different manner in the second state than the first state.

In some embodiments, the stylus includes a photoluminescent material such that the material emits a new optical beam when a disturbed optical beam is absorbed by the material.

Alternative embodiments relate to a method of determining a state of a stylus in contact with a touch sensitive surface. The touch sensitive surface has emitters that emit optical beams and detectors that detect optical beams. The stylus can switch between a first state and a second state. The stylus disturbs a portion of the optical beams in a different manner in the second state than the first state. Beam data is received from the detectors. The beam data is analyzed to identify the portion of the beams disturbed by a touch event from the stylus. The state of the stylus is determined based on the portion of the beams disturbed by the touch event.

In some embodiments, determining the state of the stylus based on the identified beams includes additional steps. Beam transmission values are selected for at least two beams disturbed by the touch event. An attenuation value is calculated based on the selected beam transmission values. The state of the stylus is determined based on the calculated attenuation value.

In some embodiments, determining the state of the stylus based on the identified beams includes additional steps. Optical paths of the beams disturbed by the touch event are retrieved. A dimension of a contact area of the touch event is determined based on the retrieved optical paths. The state of the stylus is determined based on the dimension of the contact area.

In some embodiments, a portion of the emitters emit optical beams with a peak wavelength and another portion of the emitters emit optical beams with another peak wavelength. Furthermore, determining the state of the stylus based on the identified beams includes additional steps. The disturbed optical beams are associated with emitters that produced the disturbed optical beams. The disturbed optical beams are associated with peak wavelengths based on the associated emitters. An attenuation value is calculated for the disturbed optical beams associated with the peak wavelength. An attenuation value is calculated for the disturbed optical beams associated with the other peak wavelength. The state of the stylus is determined based on the attenuation values.

In some embodiments, determining the state of the stylus based on the identified beams includes additional steps. Sets of expected transmission values are estimated for given stylus states and orientations on the touch sensitive surface. A quality of fit metric by comparing transmission values of the disturbed optical beams with the sets of expected transmission values. A set of expected transmission values is selected based on the quality of fit metric. The state of the stylus is determined based on the selected set of expected transmission values. In some embodiments, determining the quality of fit metric includes calculating a correlation value for the transmission values and a set of expected transmission values.

BRIEF DESCRIPTION OF DRAWINGS

Embodiments of the present disclosure will now be described, by way of example, with reference to the accompanying drawings.

DETAILED DESCRIPTION

I. Introduction

A. Device Overview

Figure 1:
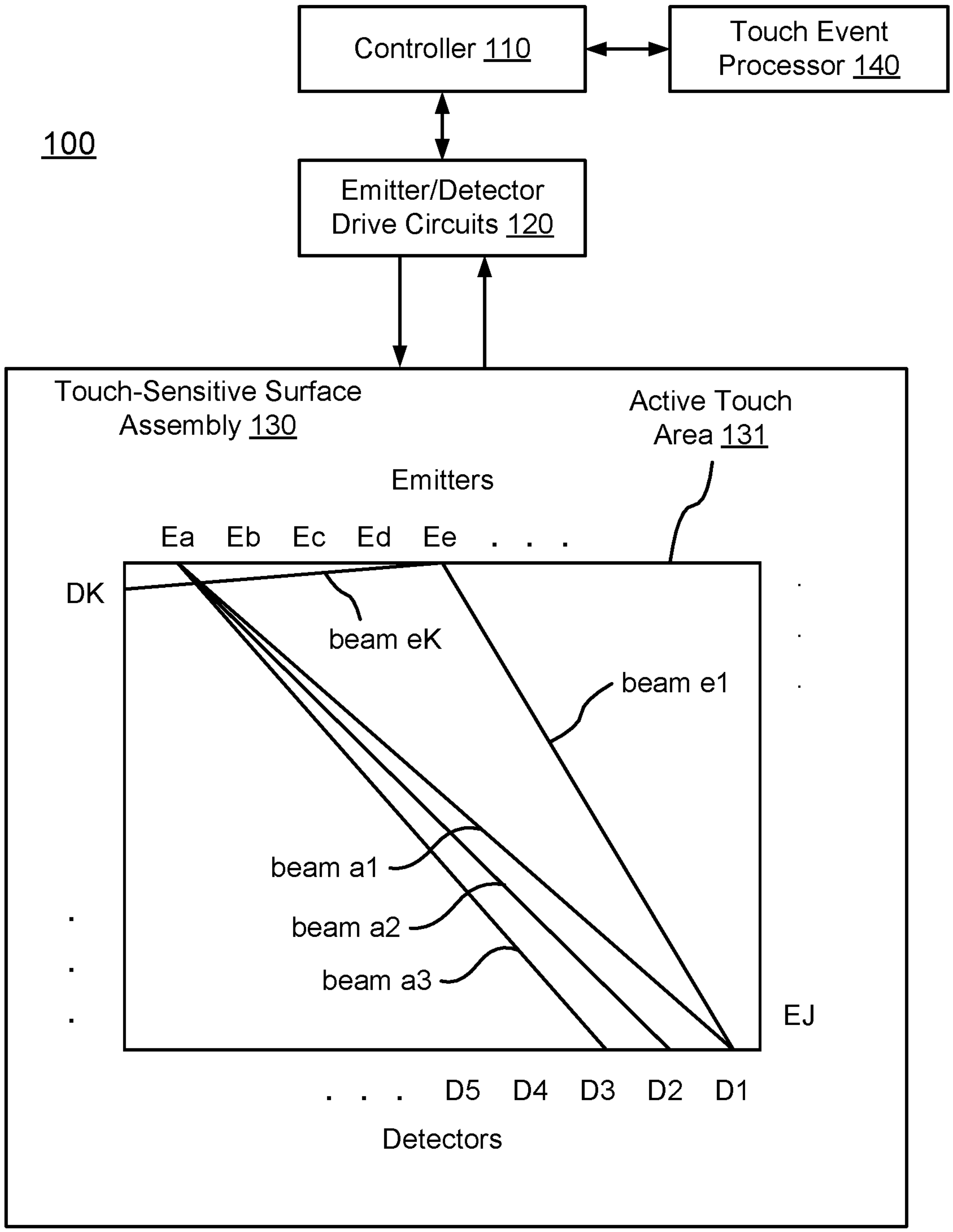
FIG. 1 is a diagram of an optical touch-sensitive device, according to an embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active touch area or active touch surface, even though the surface itself may be an entirely passive structure. The assembly 130 also includes emitters and detectors arranged along the periphery of the active touch surface 131 (although the emitters and detectors may only be arranged along a portion of the periphery or not along the periphery at all). In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, el and eK as examples. Touches within the active touch area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes compared to conventional touch devices that cover an active touch area with sensors, such as resistive and capacitive sensors. Since the emitters and detectors are positioned around the periphery, increasing the screen size by a linear factor of N means that the periphery also scales by a factor of N compared to $N^2$ for conventional touch devices.

B. Process Overview

Figure 2:
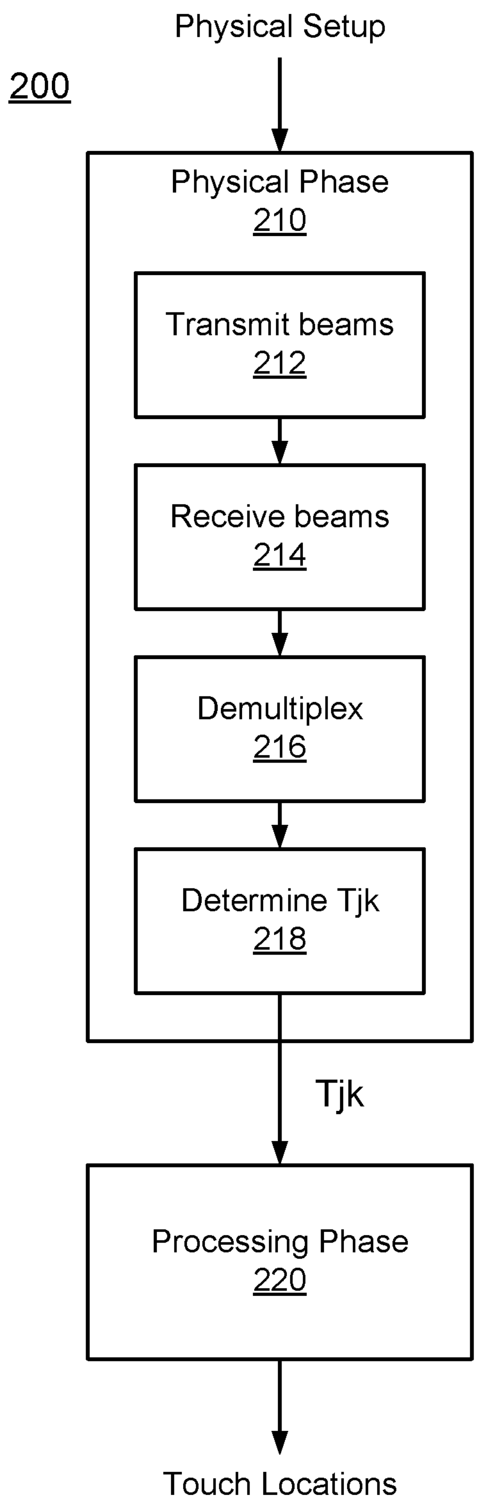
FIG. 2 is a flow diagram for determining the characteristics of touch events, according to an embodiment.

FIG. 2 is a flow diagram for determining the characteristics of touch events, according to an embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection, or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 computes the touch characteristics and can be implemented in many different ways. Candidate touch points, line imaging, location interpolation, touch event templates and multi-pass approaches are all examples of techniques that may be used to compute the touch characteristics (such as touch location and touch strength) as part of the processing phase 220. Several of these are described below, primarily in Section III.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Not all touch objects are equally good beam attenuators, as indicated by their transmission coefficient Tjk. Beam attenuation mainly depends on the optical transparency of the object and the volume of the object portion that is interacting with the beam, i.e. the object portion that intersects the beam propagation volume.

Figure 3A:
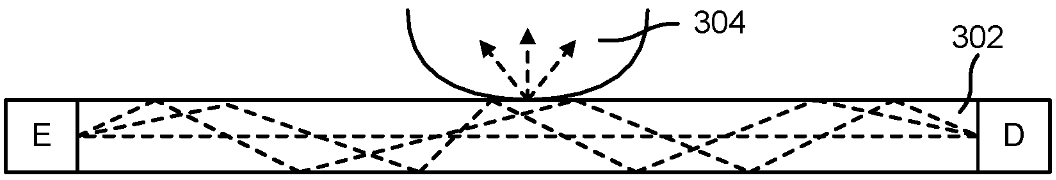
FIG. 3A-3F illustrate example mechanisms for a touch interaction with an optical beam, according to some embodiments.

FIGS. 3A-3F illustrate different mechanisms for a touch interaction with an optical beam. FIG. 3A illustrates a mechanism based on frustrated total internal reflection (TIR). The optical beam, shown as a dashed line, travels from emitter E to detector D through an optically transparent planar waveguide 302. The beam is confined to the waveguide 302 by total internal reflection. The waveguide may be constructed of plastic or glass, for example. An object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3B:
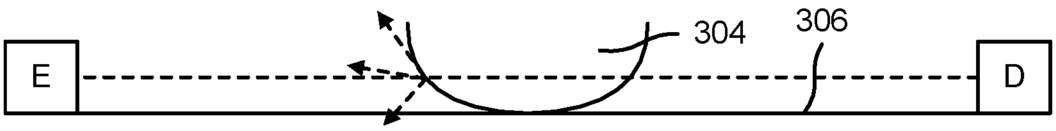

FIG. 3B illustrates a mechanism based on beam blockage (also referred to as an "over the surface" (OTS) configuration). Emitters produce beams which are in close proximity to a surface 306. An object 304 coming into contact with the surface 306 will partially or entirely block beams within the contact area. FIGS. 3A and 3B illustrate some physical mechanisms for touch interactions, but other mechanisms can also be used. For example, the touch interaction may be based on changes in polarization, scattering, or changes in propagation direction or propagation angle (either vertically or horizontally).

Figure 3C:
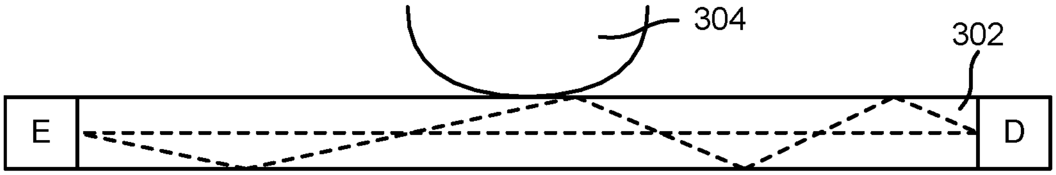

For example, FIG. 3C illustrates a different mechanism based on propagation angle. In this example, the optical beam is guided in a waveguide 302 via TIR. The optical beam hits the waveguide-air interface at a certain angle and is reflected back at the same angle. However, the touch 304 changes the angle at which the optical beam is propagating. In FIG. 3C, the optical beam travels at a steeper angle of propagation after the touch 304. The detector D has a response that varies as a function of the angle of propagation. The detector D could be more sensitive to the optical beam travelling at the original angle of propagation or it could be less sensitive. Regardless, an optical beam that is disturbed by a touch 304 will produce a different response at detector D.

Figure 3D:
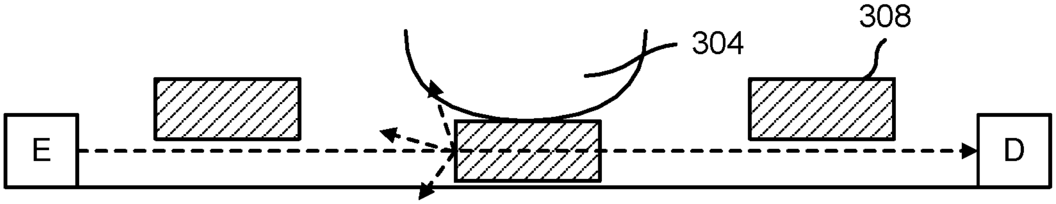

In FIGS. 3A-3C, the touching object was also the object that interacted with the beam. This will be referred to as a direct interaction. In an indirect interaction, the touching object interacts with an intermediate object, which interacts with the optical beam. FIG. 3D shows an example that uses intermediate blocking structures 308. Normally, these structures 308 do not block the beam. However, in FIG. 3D, object 304 contacts the blocking structure 308, which causes it to partially or entirely block the optical beam. In FIG. 3D, the structures 308 are shown as discrete objects, but they do not have to be so.

Figure 3E:
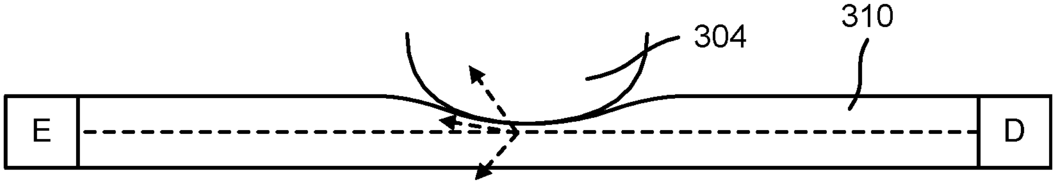

In FIG. 3E, the intermediate structure 310 is a compressible, partially transmitting sheet. When there is no touch, the sheet attenuates the beam by a certain amount. In FIG. 3E, the touch 304 compresses the sheet, thus changing the attenuation of the beam. For example, the upper part of the sheet may be more opaque than the lower part, so that compression decreases the transmittance. Alternatively, the sheet may have a certain density of scattering sites. Compression increases the density in the contact area, since the same number of scattering sites occupies a smaller volume, thus decreasing the transmittance. Analogous indirect approaches can also be used for frustrated TIR. Note that this approach could be used to measure contact pressure or touch velocity, based on the degree or rate of compression.

The touch mechanism may also enhance transmission, instead of or in addition to reducing transmission. For example, the touch interaction in FIG. 3E might increase the transmission instead of reducing it. The upper part of the sheet may be more transparent than the lower part, so that compression increases the transmittance.

Figure 3F:
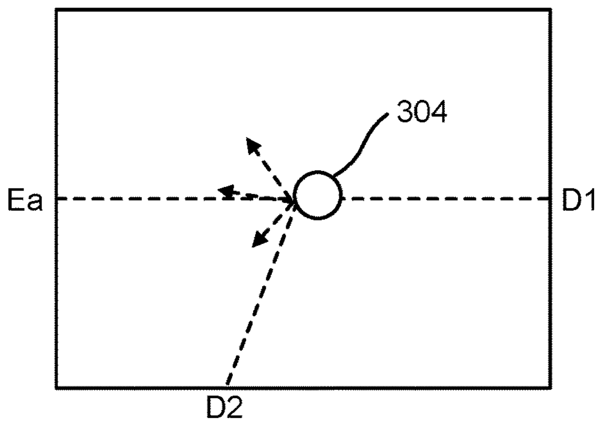

FIG. 3F shows another example where the transmittance between an emitter and detector increases due to a touch interaction. FIG. 3F is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking. Whether the touch interaction mechanism is binary or analog depends in part on the nature of the interaction between the touch and the beam. It does not depend on the lateral width of the beam (which can also be manipulated to obtain a binary or analog attenuation, as described below), although it might depend on the vertical size of the beam.

Figure 4:
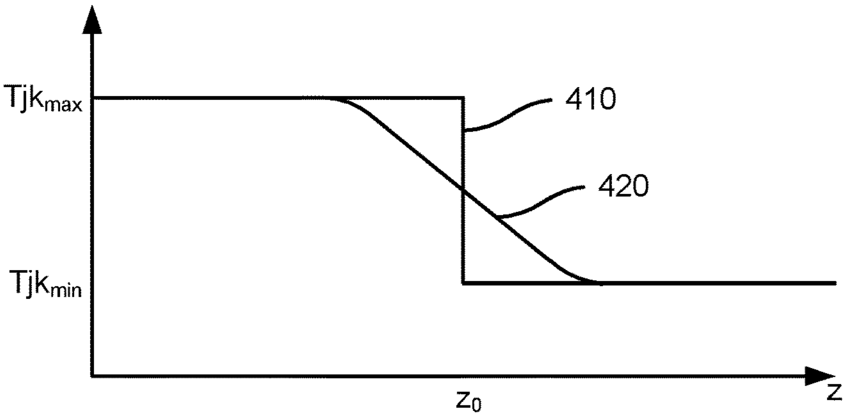
FIG. 4 is a graph of binary and analog touch interactions, according to an embodiment.

FIG. 4 is a graph illustrating a binary touch interaction mechanism compared to an analog touch interaction mechanism. FIG. 4 graphs the transmittance Tjk as a function of the depth z of the touch. The dimension z is into and out of the active touch surface. Curve 410 is a binary response. At low z (i.e., when the touch has not yet disturbed the beam), the transmittance Tjk is at its maximum. However, at some point zO, the touch breaks the beam and the transmittance Tjk falls fairly suddenly to its minimum value. Curve 420 shows an analog response where the transition from maximum Tjk to minimum Tjk occurs over a wider range of z. If curve 420 is well behaved, it is possible to estimate z from the measured value of Tjk.

C. Emitters, Detectors and Couplers

Each emitter transmits light to a number of detectors. Usually, each emitter outputs light to more than one detector simultaneously. Similarly, each detector may receive light from a number of different emitters. The optical beams may be visible, infrared (IR) and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths are shown unfolded for clarity. Thus, sources, optical beams and sensors are shown as lying in one plane. In actual implementations, the sources and sensors typically do not lie in the same plane as the optical beams. Various coupling approaches can be used. For example, a planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Pat. No. 9,170,683, entitled "Optical Coupler," which is incorporated by reference herein.

D. Optical Beam Paths

Figure 5A:
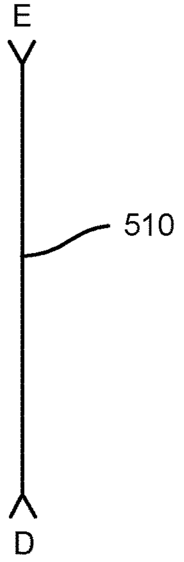
FIGS. 5A-5C are top views of differently shaped beam footprints, according to some embodiments.
Figure 5B:
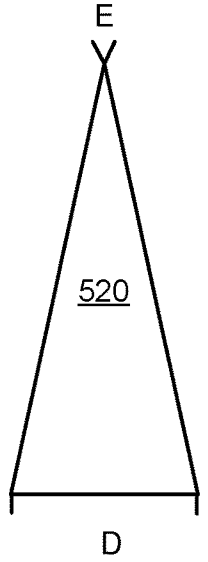
Figure 5C:
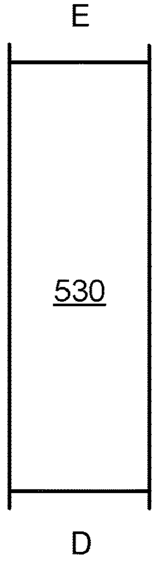

Another aspect of a touch-sensitive system is the shape and location of the optical beams and beam paths. In FIG. 1, the optical beams are shown as lines. These lines should be interpreted as representative of the beams, but the beams themselves are not necessarily narrow pencil beams. FIGS. 5A-5C illustrate different beam shapes when projected onto the active touch surface (beam footprint).

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide. Rather, optics (e.g., cylindrical lenses or mirrors) can be used to effectively widen or narrow the lateral extent of the actual sources and sensors.

Figure 6A:
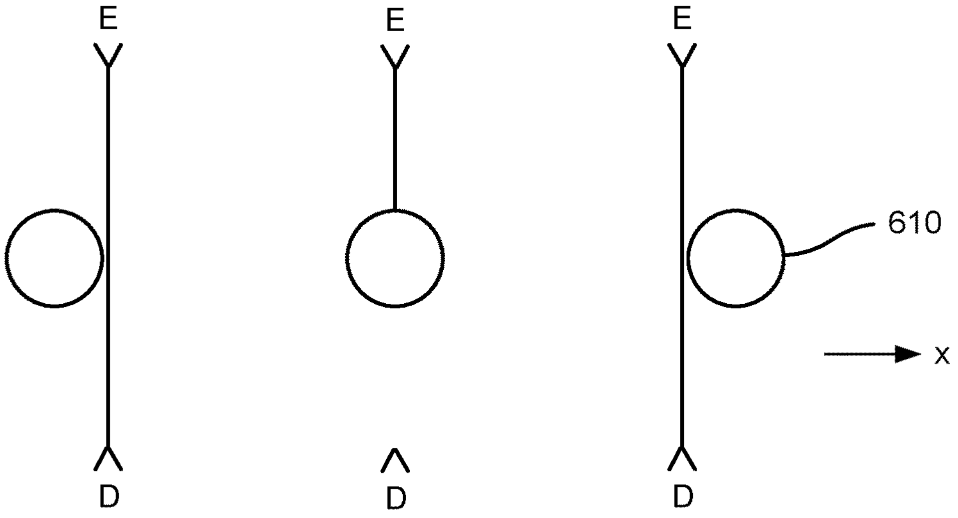
FIGS. 6A-6B are top views illustrating a touch point travelling through a narrow beam and a wide beam, respectively, according to some embodiments.
Figure 6B:
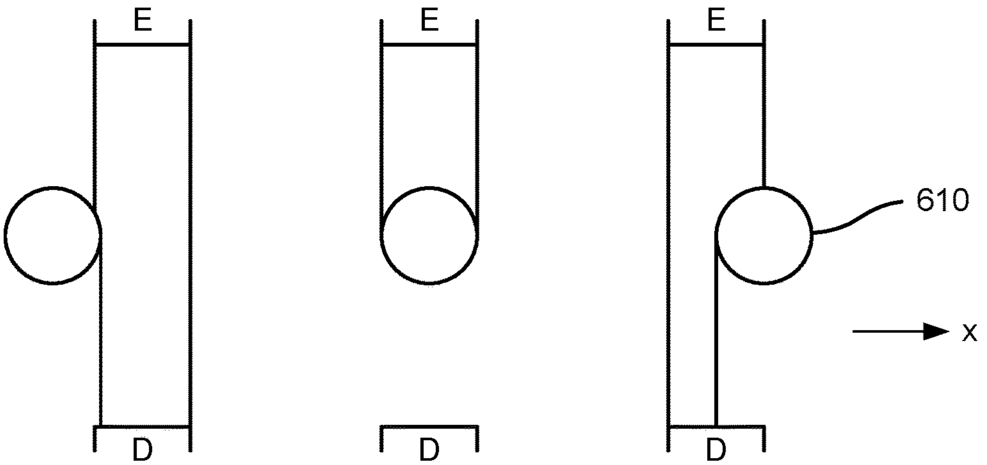
Figure 7:
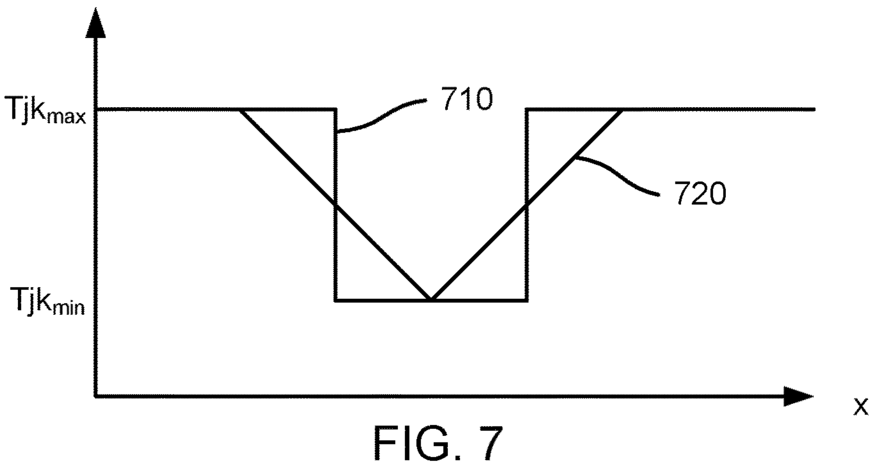
FIG. 7 is a graph of the binary and analog responses for the narrow and wide beams of FIG. 6, according to some embodiments.

FIGS. 6A-6B and 7 show, for a constant z position and various x positions, how the width of the footprint can determine whether the transmission coefficient Tjk behaves as a binary or analog quantity. In these figures, a touch point has contact area 610. Assume that the touch is fully blocking, so that any light that hits contact area 610 will be blocked. FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

E. Active Touch Area Coverage

Figure 8A:
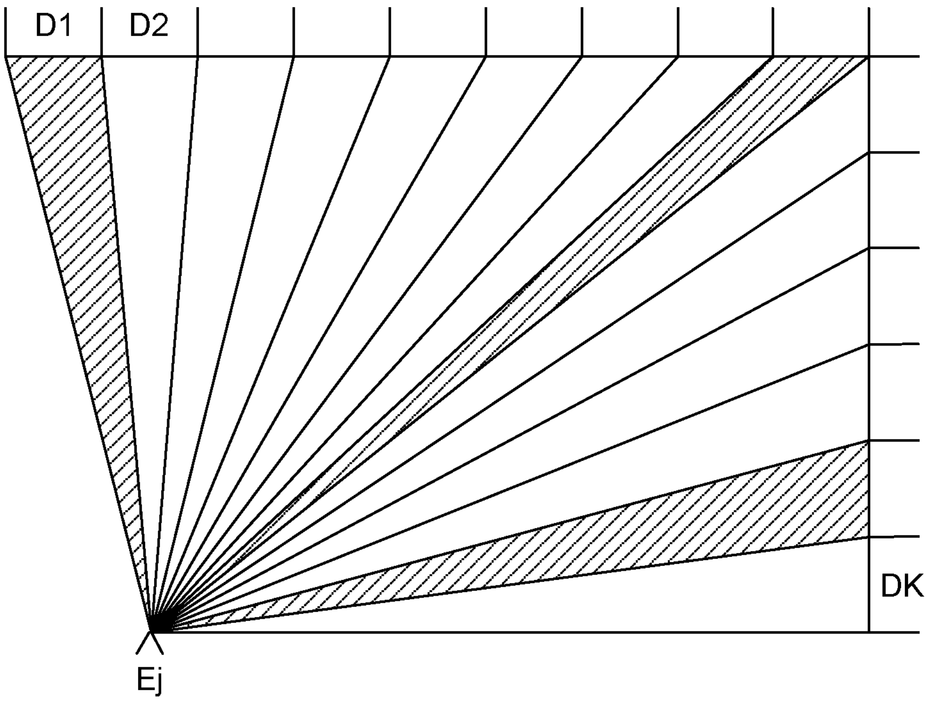
FIGS. 8A and 8B are top views illustrating active touch area coverage by emitters, according to some embodiments.
Figure 8B:
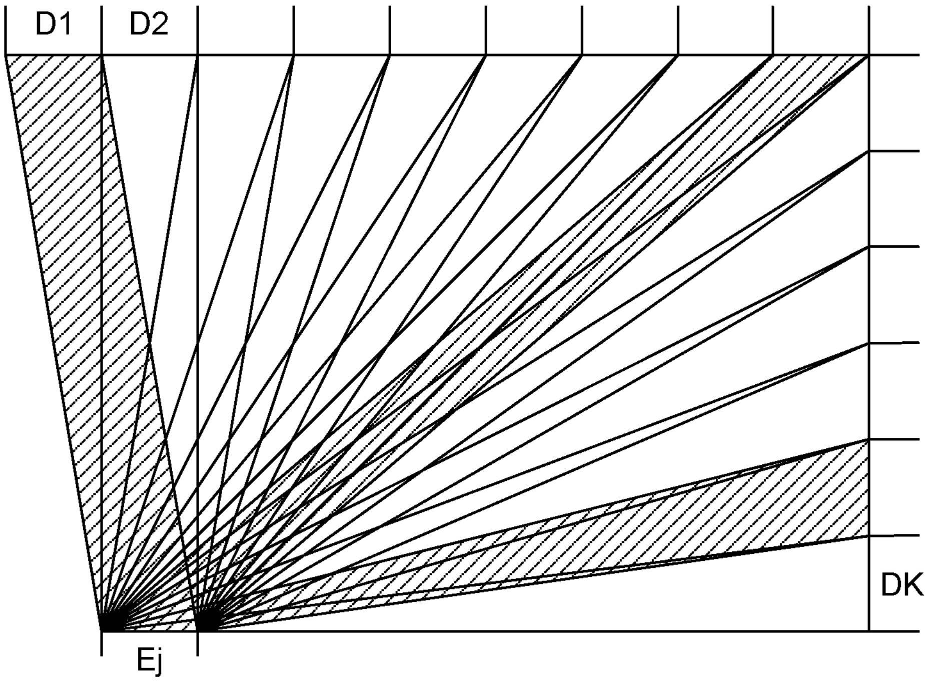

FIG. 8A is a top view illustrating the beam pattern produced by a point emitter. Emitter Ej transmits beams to wide detectors D1-DK. Three beams are shaded for clarity: beam j1, beam j(K−1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej. FIG. 8B is a similar diagram, except that emitter Ej is a wide emitter and produces beams with "rectangular" footprints (actually, trapezoidal but we will refer to them as rectangular). The three shaded beams are for the same detectors as in FIG. 8A.

Note that every emitter Ej may not produce beams for every detector Dk. In FIG. 1, consider beam path aK which would go from emitter Ea to detector DK. First, the light produced by emitter Ea may not travel in this direction (i.e., the radiant angle of the emitter may not be wide enough) so there may be no physical beam at all, or the acceptance angle of the detector may not be wide enough so that the detector does not detect the incident light. Second, even if there was a beam and it was detectable, it may be ignored because the beam path is not located in a position to produce useful information. Hence, the transmission coefficients Tjk may not have values for all combinations of emitters Ej and detectors Dk.

The footprints of individual beams from an emitter and the coverage area of all beams from an emitter can be described using different quantities. Spatial extent (i.e., width), angular extent (i.e., radiant angle for emitters, acceptance angle for detectors), and footprint shape are quantities that can be used to describe individual beam paths as well as an individual emitter's coverage area.

An individual beam path from one emitter Ej to one detector Dk can be described by the emitter Ej's width, the detector Dk's width and/or the angles and shape defining the beam path between the two.

These individual beam paths can be aggregated over all detectors for one emitter Ej to produce the coverage area for emitter Ej. Emitter Ej's coverage area can be described by the emitter Ej's width, the aggregate width of the relevant detectors Dk and/or the angles and shape defining the aggregate of the beam paths from emitter Ej. Note that the individual footprints may overlap (see FIG. 8B close to the emitter). Therefore, an emitter's coverage area may not be equal to the sum of its footprints. The ratio of (the sum of an emitter's footprints)/(emitter's cover area) is one measure of the amount of overlap.

The coverage areas for individual emitters can be aggregated over all emitters to obtain the overall coverage for the system. In this case, the shape of the overall coverage area is not so interesting because it should cover the entirety of the active touch area 131. However, not all points within the active touch area 131 will be covered equally. Some points may be traversed by many beam paths while other points traversed by far fewer. The distribution of beam paths over the active touch area 131 may be characterized by calculating how many beam paths traverse different (x,y) points within the active touch area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

Figure 8C:
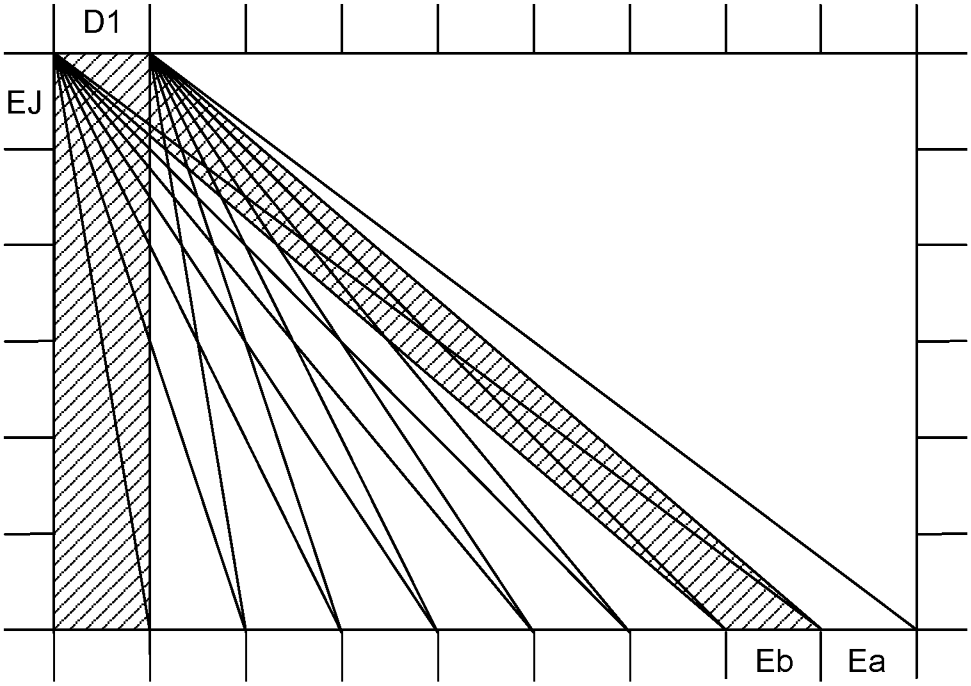
FIGS. 8C and 8D are top views illustrating active touch area coverage by detectors, according to some embodiments.
Figure 8D:
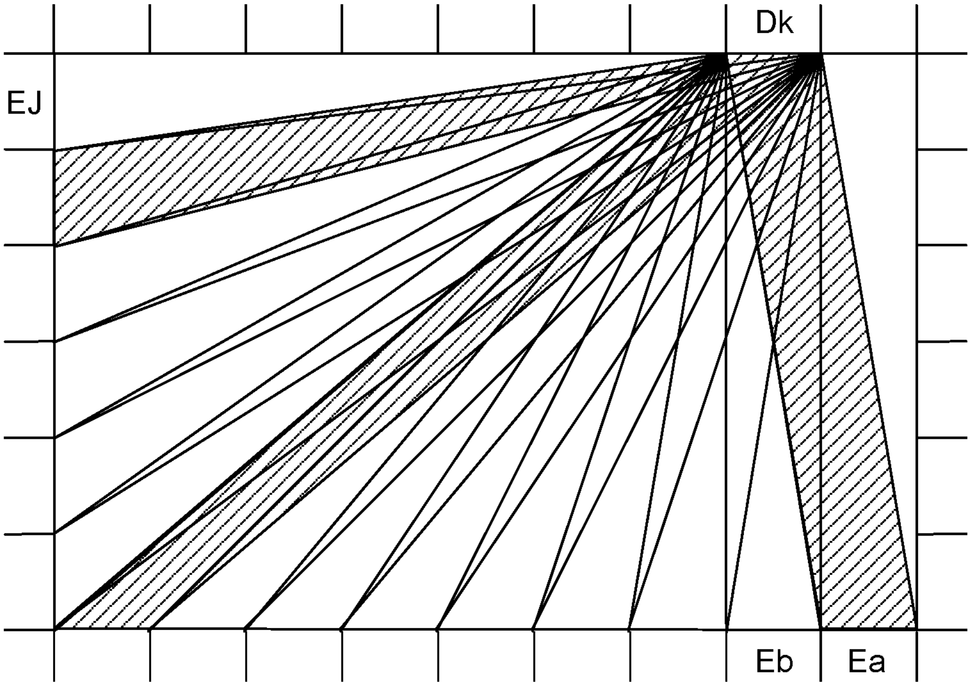

The discussion above for emitters also holds for detectors. The diagrams constructed for emitters in FIGS. 8A-8B can also be constructed for detectors. For example, FIG. 8C shows a similar diagram for detector D1 of FIG. 8B. That is, FIG. 8C shows all beam paths received by detector D1. Note that in this example, the beam paths to detector D1 are only from emitters along the bottom edge of the active touch area. The emitters on the left edge are not worth connecting to D1 and there are no emitters on the right edge (in this example design). FIG. 8D shows a diagram for detector Dk, which is an analogous position to emitter Ej in FIG. 8B.

A detector Dk's coverage area is then the aggregate of all footprints for beams received by a detector Dk. The aggregate of all detector coverage areas gives the overall system coverage.

The coverage of the active touch area 131 depends on the shapes of the beam paths, but also depends on the arrangement of emitters and detectors. In most applications, the active touch area is rectangular in shape, and the emitters and detectors are located along the four edges of the rectangle.

Figure 8E:
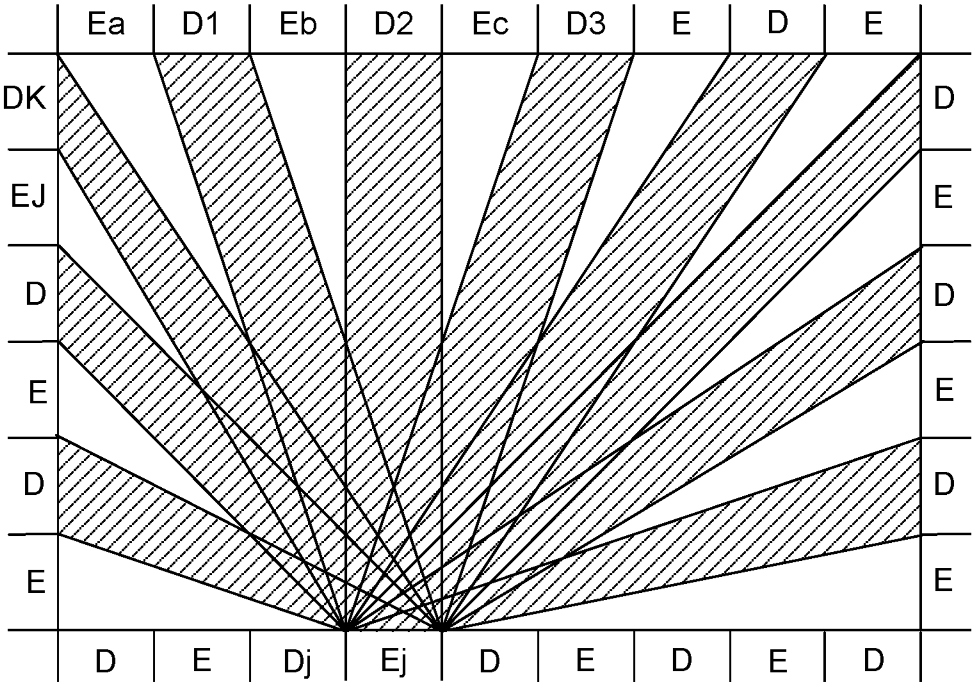
FIG. 8E is a top view illustrating alternating emitters and detectors, according to an embodiment.

In a preferred approach, rather than having only emitters along certain edges and only detectors along the other edges, emitters and detectors are interleaved along the edges. FIG. 8E shows an example of this where emitters and detectors are alternated along all four edges. The shaded beams show the coverage area for emitter Ej.

F. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. Pat. No. 8,227,742, entitled "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller cycles through the emitters quickly enough to meet a specified touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

G. Control Stylus

Instead of a user's finger, a user may interact with the touch surface via a stylus. A stylus with a control (referred to as a control stylus) can have multiple operational states that disturb beams differently. The control changes the state of the stylus from one state to another. Thus, a user of a control stylus can change the state of the stylus by interacting with the one or more controls integrated into or separate from the stylus body. A control may be mechanical, such as a button, switch, lever, rotary dial, band, rotating section of the stylus body, roller, slider, or acceleration-sensing weight. For simplicity in the remainder of this description, control styli (or the controls themselves) are described as having a 'default state' and an 'alternative state,' however control styli can have any number of distinct states and the terms 'default' and 'alternative' are merely categorical terms used to distinguish one state from another. Thus, no one state may necessarily be the default or alternative state. Furthermore, the control may change the state of the stylus from one state to another state in a set states, in which case, references to particular states may refer to any particular state in the set that has significance in a given use case. For additional simplicity, a control of a stylus is described as being 'un-pressed' and 'pressed.' The un-pressed state corresponds to the stylus being in the default state and the pressed state corresponds to the stylus being in the alternative state. However, the control may be activated by the user in manners other than pressing and/or a stylus may be in its default state when the control is not activated (e.g., a stylus is in the default state when a "draw" button is pressed and an alternate state when the user releases the draw button).

Because each state of the stylus disturbs beams differently, writing or otherwise contacting the touch surface with a control stylus allows the touch device 100 to determine of the state. The state can be used as an indicator of a user selection, and the state can be changed without changing the touch position on the touch screen. A program rendering annotations in a host computer may use a stylus state to emulate various annotation effects, such as visualizing annotations with wider lines or with different colors. In another example, when the stylus is in a default state, a screen with the touch sensor may display back ink at locations where the stylus touches the screen (mimicking a pen drawing on paper), yet when the stylus is in the alternative state, the system may allow the user to move the ink markings on the screen. Thus, user experience is improved for systems in which the stylus state is determined.

A control stylus may be an active or a passive stylus. Passive styli interact with the optical beams transmitted between emitters and detectors but do not but do not include electronic components or a power source. Active styli include a power source and electronic components that interact with the touch device 100. Active styli may add energy and may contain their own emitter(s) and detector(s). Active styli may contain a communications channel, for example a wireless connection, in order to coordinate their operation with the rest of the optical touch detection system. One advantage of styli compared to fingers, is that the stylus, and specifically its tip, can be designed to achieve a specific touch interaction with the optical beams. Different styli can be designed to implement different touch interactions, and they can then be distinguished on that basis.

For convenience, in the remainder of this description, styli are described as disturbing beams. Disturbed beams are beams affected by a stylus that would otherwise not be affected if the stylus did not interact with the touch device 100. Depending on the construction of the stylus, disturbing may include blocking, absorbing, attenuating, amplifying, scattering, reflecting, refracting, diffracting, filtering, redirecting, etc.

Control styli may generally be configured to interact with a frustrated TIR touch surface (described with reference to FIG. 3A) or an OTS touch surface (described with reference to FIG. 3B). Control styli for frustrated TIR touch surfaces generally disturb beams by virtue of the tip material having a refractive index higher than that of the surrounding air. This can cause beams to be coupled from the waveguide into the tip. Control styli for OTS touch surfaces generally include tips that are partially transmissive to beams. This allows beams to pass through the tip, yet be disturbed (e.g., attenuated) enough to be detected by the detectors. The control of the stylus may change the amount of beam disturbance by changing the optical path through the tip, the proportion of a beam's cross-section that interacts with the tip, or the number of beams disturbed by the stylus. For example, in an alternative state, a push rod is driven towards a hollow and partially transmissive tip. The additional material in the tip results in increased disturbance (e.g., attenuation or wavelength filtering) of the beams disturbed by the stylus.

In this description, styli are described and illustrated as disturbing beams when they are in contact with the touch surface. A stylus in contact with a touch surface is defined to include a stylus physically contacting the surface and a stylus in close enough proximity to disturb beams. For example, a stylus interacting with an OTS touch surface is in contact with the surface (even if it is not physically contacting the surface) if the stylus is disturbing beams propagating over the surface.

FIGS. 9A-13D and their related descriptions describe control styli for frustrated TIR touch surfaces and FIGS. 14A-15B and their related descriptions describe control styli for OTS touch surfaces. However, a stylus may be configured to interact with both surfaces or a stylus configured for one surface may be modified to interact with the other surface.

Figure 9A:
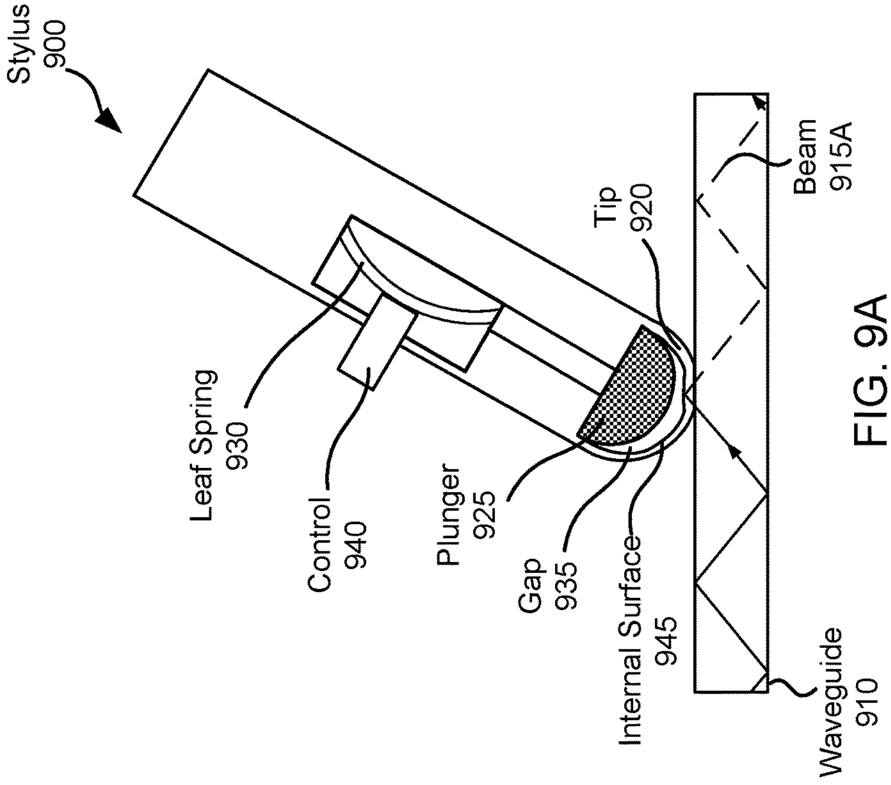
FIGS. 9A and 9B are cross-sectional views of a stylus in contact with a touch sensitive waveguide, according to some embodiments.
Figure 9B:
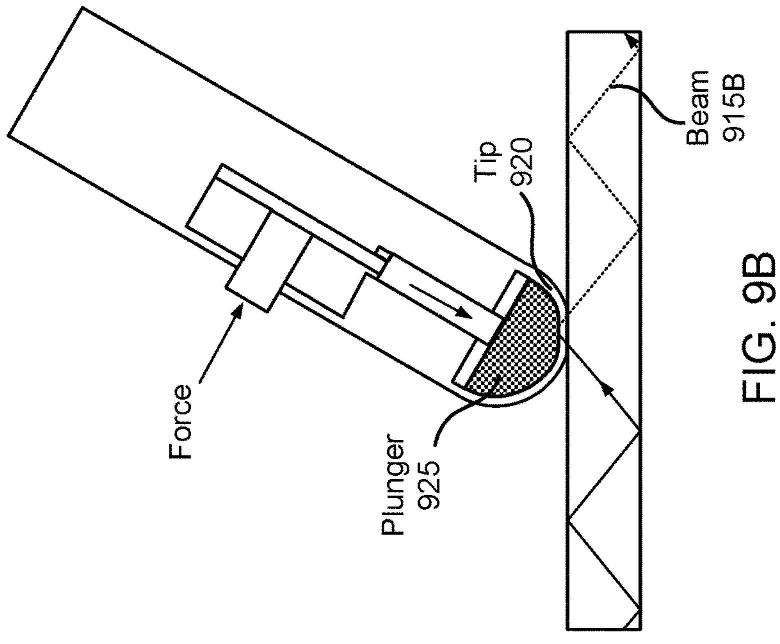

FIGS. 9A and 9B are cross-sectional views of a control stylus 900 in contact with a touch sensitive waveguide 910, according to some embodiments. FIG. 9A illustrates the stylus 900 in a default state and FIG. 9B illustrates the stylus 900 in an alternative state. In the alternative state, the stylus 900 disturbs a beam 915 differently than the default state. The stylus 900 includes a tip 920, a plunger 925, a leaf spring 930, and a control 940. The control 940 is coupled to the leaf spring 930 and the leaf spring 930 is coupled to the plunger 925. The tip 920 is hollow and includes compliant material that conforms to the surface of the waveguide 910. The tip 920 has a curved surface that allows any part of the tip 920 to contact the touch surface, however the tip 920 have other surface shapes, such as a flat planar surface. The stylus may be changed from the default state to the alternative state or vice versa by applying a force to the control 940. When the control 940 is un-pressed, the leaf spring 930 remains arched and there is a gap 935 between the internal surface 945 of the tip 920 and the plunger 925. When the control 940 is pressed, the control 940 straightens (or partially straightens) the leaf spring 930. Thus, the leaf spring 930 pushes the plunger 925 into contact with the internal surface of the tip 920.

The tip 920 includes a layer of optically transmissive material that allows beams incident on the tip 920 to be coupled into the tip 920. As a result, the beam 915A propagating in the waveguide 910 is coupled into the tip 920 and reflected back into the waveguide 910. Specifically, the coupled beam 915A is reflected by TIR at the boundary between the internal surface of the tip 920 and the gap 935. Even though the beam 915A is reflected back into the waveguide 910 from the tip 920, the touch event may still be detected. For example, the reflected beam is slightly attenuated since the optical path of beam is increased by the tip 920. In another example, the tip 920 includes a layer of partially transmissive material so that some beams are reflected back into the waveguide and some beams are absorbed by the tip 920.

When the plunger 925 is in contact with the internal surface 945 (FIG. 1B), beams coupled into the tip 920 may interact with the plunger 925. The plunger 925 may be compliant to increase the contact area between the plunger 925 and the internal surface 945. Depending on the material of the plunger 925, the plunger 925 can disturb the beam 915B in a distinct way that allows the touch device 100 to determine the beam 915B was disturbed by the plunger 925. For example, the surface of the plunger 925 includes a reflective surface, such as a mirror or metallic layer, that reflects the beam 915B. In another example, the plunger 925 includes a material (e.g., an opaque elastomer) that absorbs or attenuates the beam 915B. If the plunger 925 absorbs beams, the alternative state can result in a reduced number of beams reflecting back into the waveguide 910 compared to the default state.

The size of the gap 935 (and thus the mechanical travel of the plunger 925) can be relatively short. Specifically, to ensure a low loss reflection at the boundary of the internal surface (e.g., in the default state), the gap 935 is preferably larger than the height of the evanescent energy field (typically a fraction of the beam wavelength). For example, a gap 935 of about 500 nanometers (nm) is adequate to provide a low-loss reflection. To allow for thermal expansion and manufacturing variations, the clearance may be between 2 micrometers (μm) and 100 μm. Among other advantages this short travel can be consistent with a small travel of the control 940.

In some embodiments, the stylus 900 includes a wavelength filter to filter disturbed beams. Thus, a disturbed beam may have a different wavelength spectrum than an undisturbed beam. In another example, if sets of beams include different wavelength spectrums, a set of beams may be absorbed by the filter while the other sets may be unaffected by the filter. To filter disturbed beams the tip 920 and/or plunger 925 may include material (e.g., colored dies or pigments) that absorbs or attenuates beam wavelengths. An example wavelength filter includes a multi-layered plunger 925 with a reflective internal layer and an external filtering layer. Thus, in the alternative state, a beam coupled into the tip 920 can propagate through the external filtering layer and reflect off of the reflective internal layer. The beam can then propagate back through the external layer and tip 920 to the waveguide 910. Since the beam passed through the filtering layer, the wavelength spectrum of the beam is modified.

To provide sets of beams with variety of beam wavelengths, the touch device 100 may include sets of emitters that each emit beams with different peak wavelengths. Each set can have any number of emitters. For example, the touch device 100 includes two sets of LED emitters that alternate along the periphery. Even emitters may emit beams with peak wavelengths at 850 nanometers (nm) and odd emitters may emit beams with peak wavelengths at 940 nm so that an even distribution of beams at both wavelengths are distributed throughout the active touch area. Thus, beams of both wavelengths spectrums can be coupled into the tip 920. The detectors may be configured to detect both sets of wavelengths. For example, a silicon photodetector can be sensitive to 850 nm and 940 nm beams. This is advantageous because beam paths are available from every emitter to every detector. With this setup, if the filter is configured to filter out beams with peak wavelengths at 940 nm, the transmission coefficients Tjk will be distinctively different for emitters that emit beams with peak wavelengths at 940 nm compared to emitters that emit beams with peak wavelengths at 850 nm. In some embodiments, the number of emitters in each set is not equal. If a first set of emitters is more expensive than another set of emitters, there may only be a few emitters in the first set.

The internal surface 945 of the tip 920 may have a surface relief pattern that affects how beam are disturbed within the tip 920. For example, a surface relief pattern is designed to disturb beams such that the touch device 100 can determine that the touch object is a stylus. Surface relief patterns are further described below.

Figures 10A, 10B:
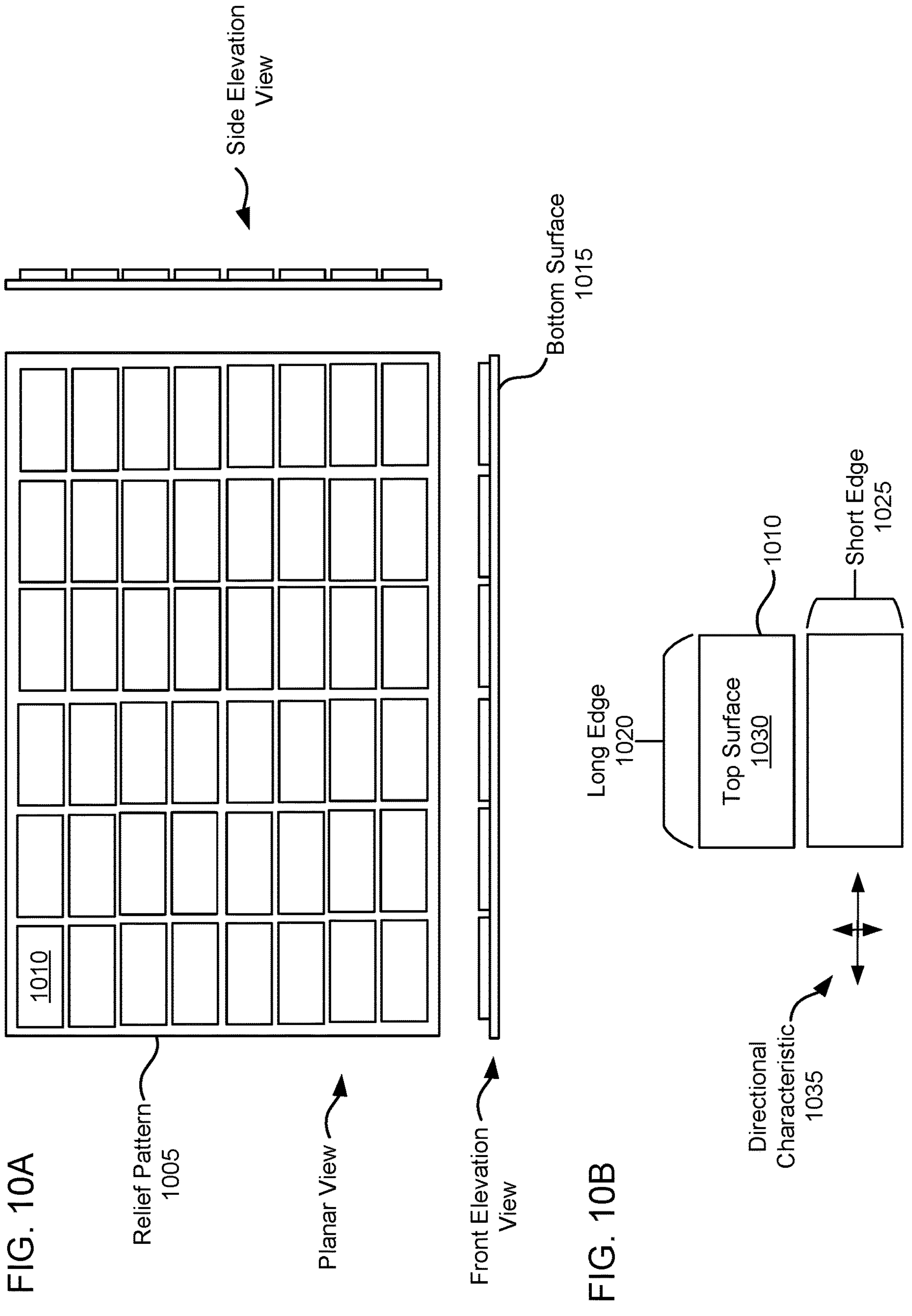
FIGS. 10A-10D are views of a relief pattern with repeating rectangular block structures on an internal surface of a stylus, according to some embodiments.

FIGS. 10A-10D are views of a relief pattern 1005 with repeating rectangular block structures 1010 on the internal surface 945, according to some embodiments. When the tip contacts the waveguide surface, the bottom surface 1015 conforms to the waveguide surface so that disturbed beams are coupled into the tip and interact with the structures 1010. Each structure 1010 has a long edge 1020, a short edge 1025, and a top surface 1030. The structures 1010 are arranged in a grid so that the long edges 1020 and short edges 1025 of each structure 1010 are parallel. FIG. 10A includes a planar (top) view, a front elevation view (parallel to a long edge 1020), and a side elevation view (parallel to the short edges 1025) of the relief pattern 1005.

FIG. 10B illustrates a zoomed in planar view of two structures 1010. FIG. 10B also includes the directional characteristic 1035 of the relief pattern. The directional characteristic 1034 illustrates the relative strength of the transmission coefficients Tjk of beams disturbed by the relief pattern 1005. To determine a touch object is a stylus and to determine the state of the stylus, the touch device 100 may determine the directional characteristic of the touch object. The repeating structures 1010 are rectangular blocks, however the structures 1010 can take other shapes and achieve similar or equivalent directional characteristics 1035. For example, the structures 1010 can be polyhedrons with at least two sides of different length (as seen from the planar view). Generally, any structure with which beams interact differently along a first axis relative to a second axis may be used.

Figure 10C:
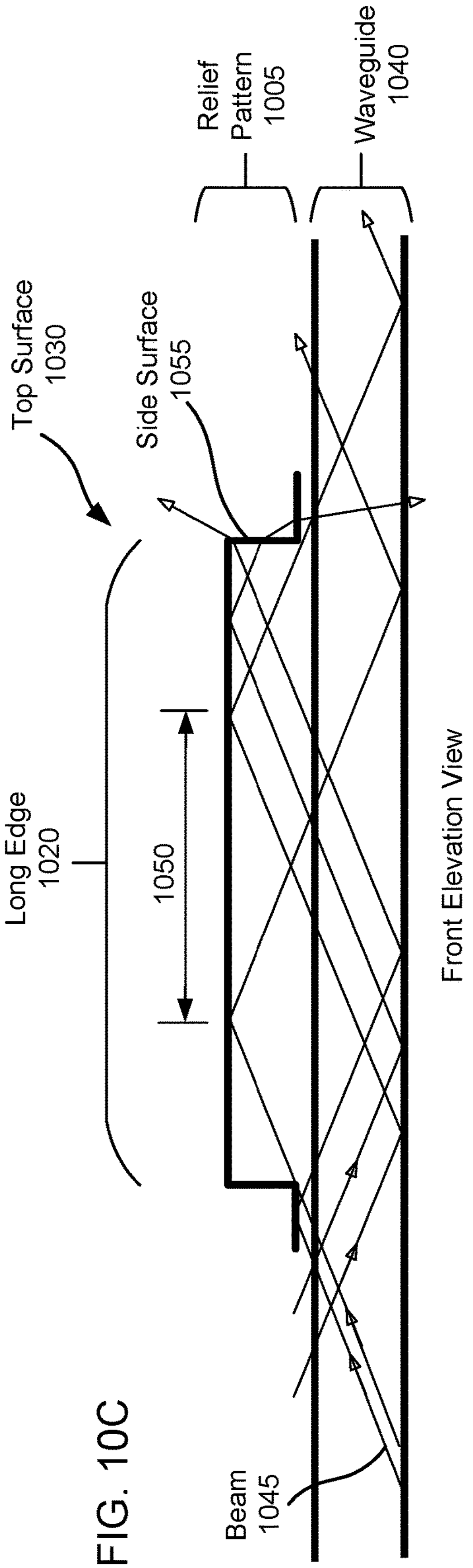

FIG. 10C is a zoomed in front elevation view of the relief pattern 1005 in contact with a waveguide 1040, according to an embodiment. The view includes a cross-section of a structure 1010 along the long edge 1020. Due to the larger length of the long edge 1020, beams 1045 propagating parallel to the long edge 1020 generally reflect via TIR off the top surface 1030 of the structure 1010 and continue propagating along the waveguide 1040 (length 1050 indicates the region of the top surface 1030 that will reflect beams back into the waveguide 1040). While some beams 1045 encounter side surfaces 1055 of the structure 1010 and are lost (e.g., reflected upwards or downwards so that the beams no longer propagate via TIR), most beams continue propagating along the waveguide 1040.

Figure 10D:
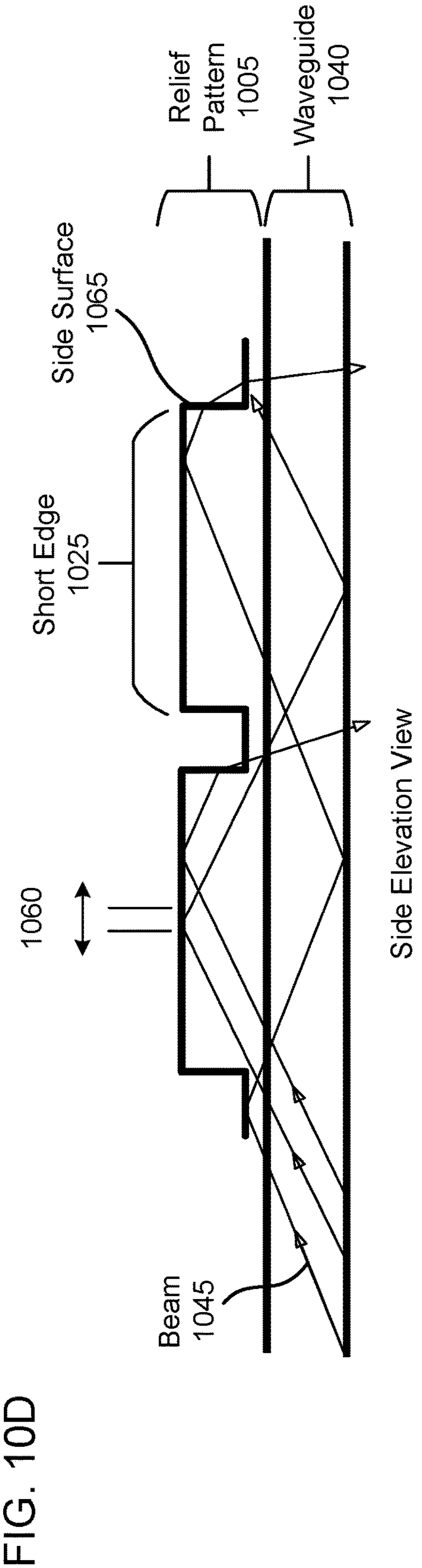

FIG. 10D is a zoomed in side elevation view of the relief pattern 1005 in contact with a waveguide 1040, according to an embodiment. The view includes a cross-section of two structures 1010 along the short edge 1025. Due to the shorter length of the short edge 1025, fewer beams 1045 propagating parallel to the short edge 1025 reflect off the top surface 1030 and continue propagating along the waveguide 1040 (length 1060 indicates the region of the of the top surface 1030 that will reflect beams back into the waveguide 1040). Most beams encounter side surfaces 1065 and are lost. When combined, the regions 1060 along the short edge 1025 represent a smaller span than the region 1050 along the long edge 1020. Thus, a greater portion of beams 1045 propagating parallel to the short edge 1025 are lost compared to beams 1045 propagating parallel to the long edge 1020. To accentuate the directional characteristic 1035 of this relief pattern 1005, the side surfaces 1055, 1065 may be uneven surfaces or include lenses to diffuse incident beams. Alternatively or additionally, the side surfaces 1055, 1065 can be coated with reflective materials (e.g., metallize surfaces) or opaque materials (e.g., inks, paints, or coatings) that are opaque to the range of wavelengths in the beams.

The structures 1010 illustrated in FIGS. 10A-10D include long edges 1020 that are approximately twice as long as the short edges 1025. Example dimensions of the rectangular block structures 1010 are a hundred μm along the long edge 1020, fifty μm along the short edge 1025, and ten μm high. Other dimensions are possible as the directional characteristic 1035 is determined by the relative sizes of the dimensions. However, diffractive effects may become prominent when approaching the size of the beam wavelengths.

Figure 11B:
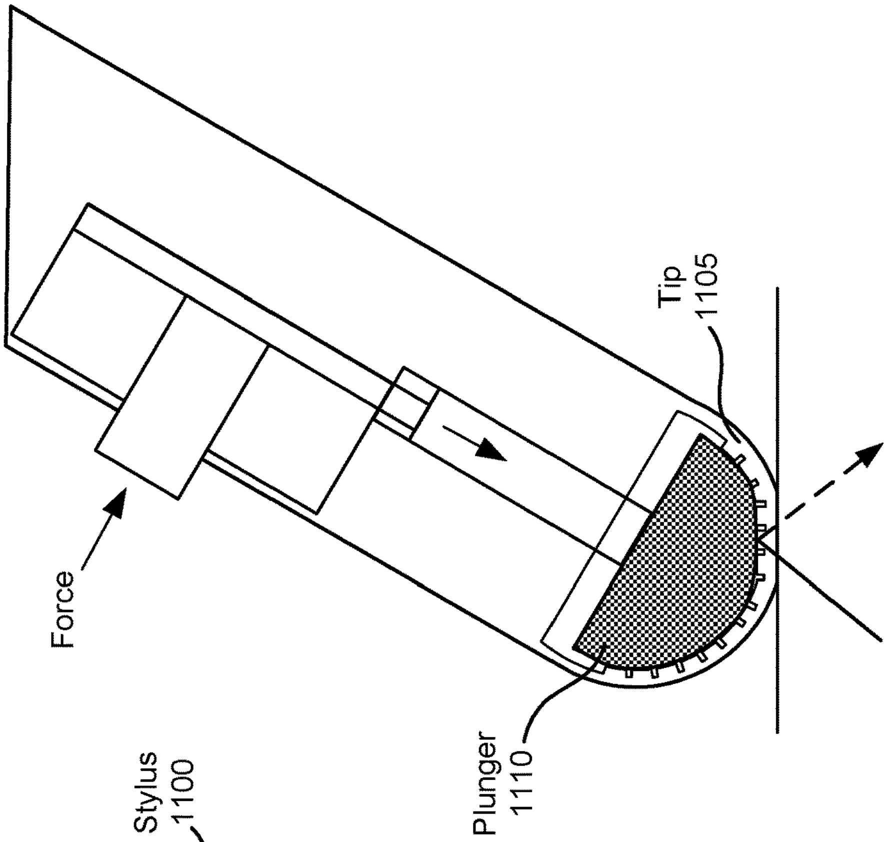
FIGS. 11A and 11B are cross-sectional views of a stylus with the relief pattern of FIGS. 10A-10D, according to some embodiments.
Figure 11A:
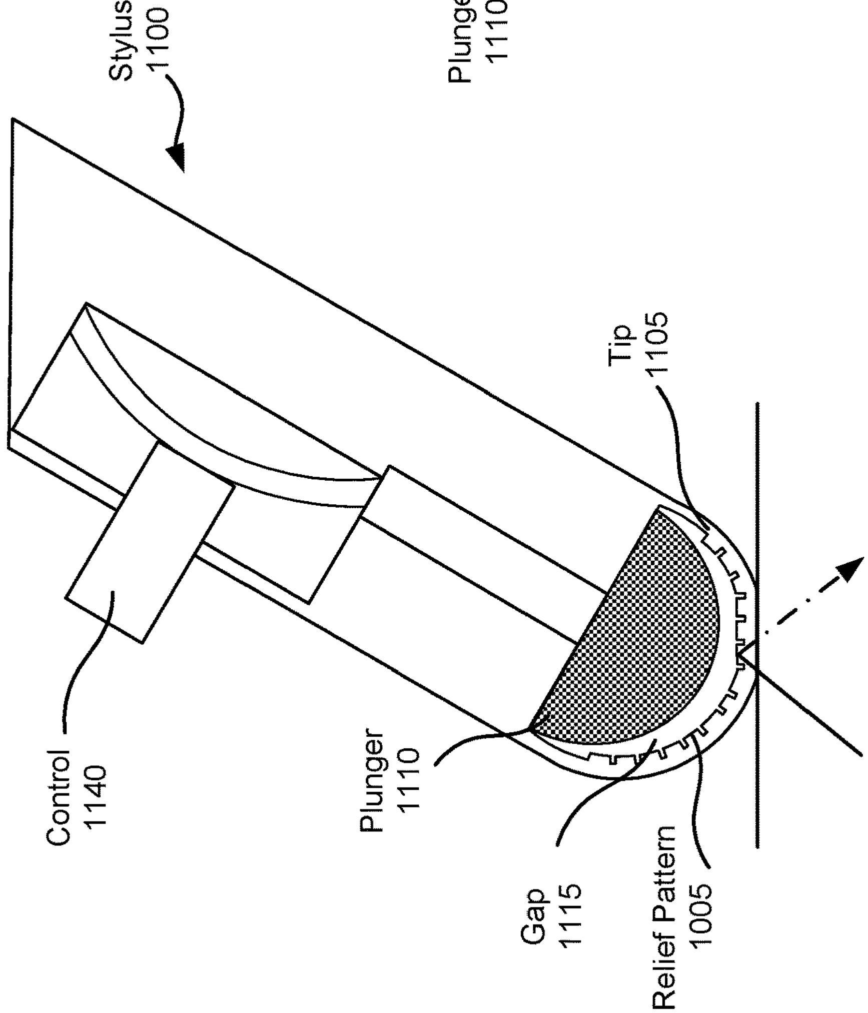

FIGS. 11A and 11B are cross-sectional views of a control stylus 1100 with the relief pattern 1005 of FIGS. 10A-10D, according to some embodiments. Specifically, the internal surface of the tip 1105 includes the repeating rectangular block structures 1010. Similar to stylus 900, stylus 1100 includes a tip 1105, a plunger 1110, a leaf spring, and a control 1140. In the default state (FIG. 3A), the control 1140 is un-pressed and there is a gap 1115 between the plunger 1110 and the relief pattern 1005. In the alternative state (FIG. 3B), the control is pressed, and the plunger 1110 is pressed against the relief pattern 1005.

In the default state, the relief pattern 1005 may disturb beams according to the directional characteristic 1035. In the alternative state, the stylus 1100 may have a different directional characteristic due to the plunger 1110 interacting with disturbed beams. For example, if the plunger 1110 includes material that absorbs beams, fewer beams may be reflected back into the waveguide from the tip 1105 in the alternative state than the default state. This may make the directional characteristic uniform in all directions. Since the directional characteristic is different for each state, the touch device 100 may recognize the state of the stylus 1100 by determining the directional characteristic of the disturbed beams.

Figure 12:
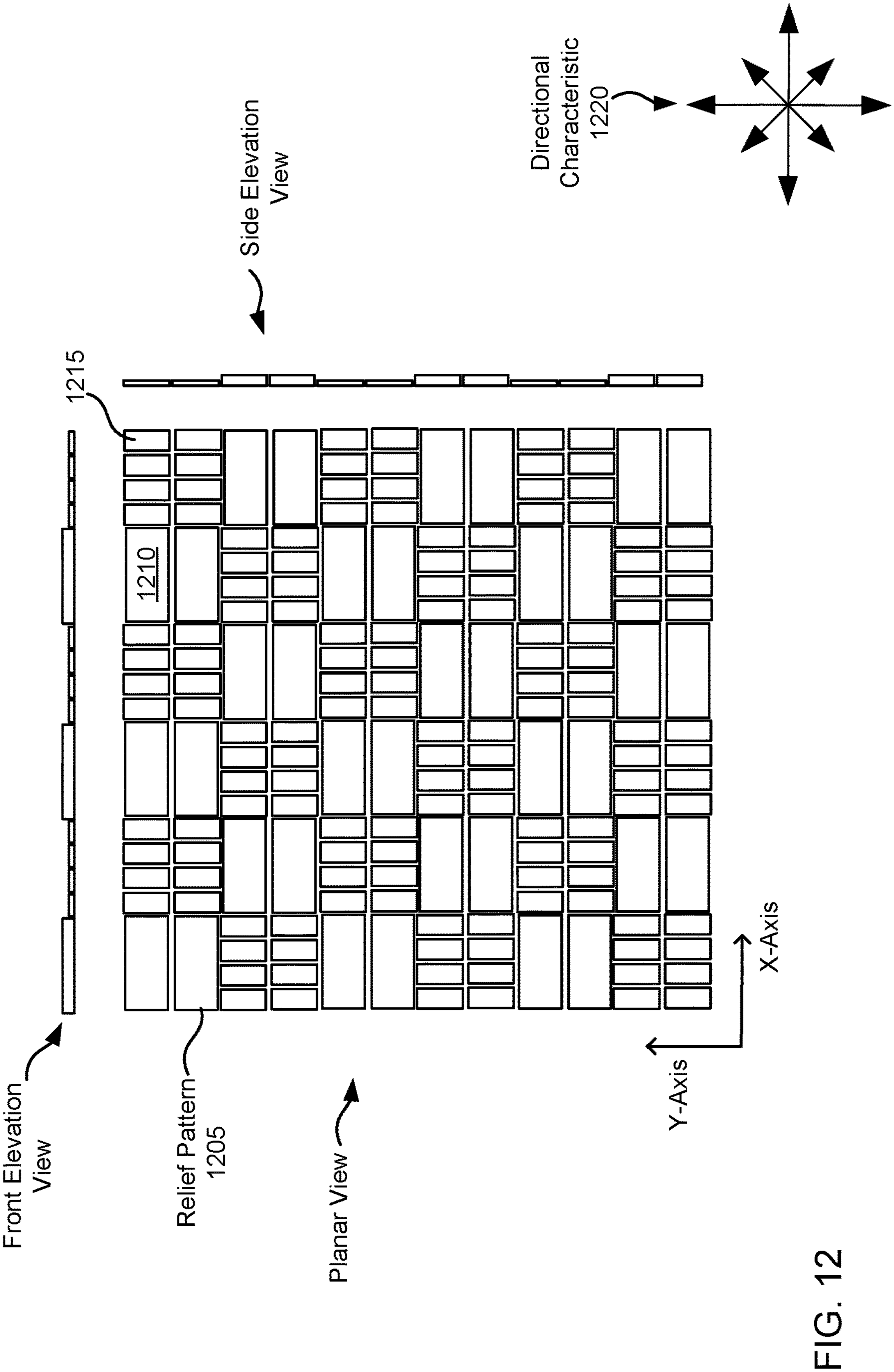
FIG. 12 illustrates views of a relief pattern with alternating groups of large blocks and small blocks, according to an embodiment.

FIG. 12 illustrates views of a relief pattern 1205 with alternating groups of large blocks 1210 and small blocks 1215, according to an embodiment. Similar to FIG. 2A, FIG. 4 includes a planar (top) view, a front elevation view, and a side elevation view of the relief pattern 1205. Each group of large blocks 1210 includes two large rectangular blocks 1210, and each group of small blocks 1215 includes eight small rectangular blocks 1215. The long edges of the small blocks 1215 are roughly equal to the short edges of the large blocks 1210. Additionally, the long edges of the large blocks 1210 are parallel to an x-axis and the long edges of the small blocks 1215 are parallel to a y-axis. Due to the alternating groups of blocks, the pattern 1205 equally attenuates beams propagating along the x and y axes. Furthermore, as indicated by the directional characteristic 1220, beams propagating in a diagonal direction are attenuated more than beams propagating along the axes. A similar directional characteristic 1220 can also be achieved by alternating the orientation of a single block size. As indicated in the front and side elevation views, the large blocks 1210 are taller than the small blocks 1215.

Figure 13A:
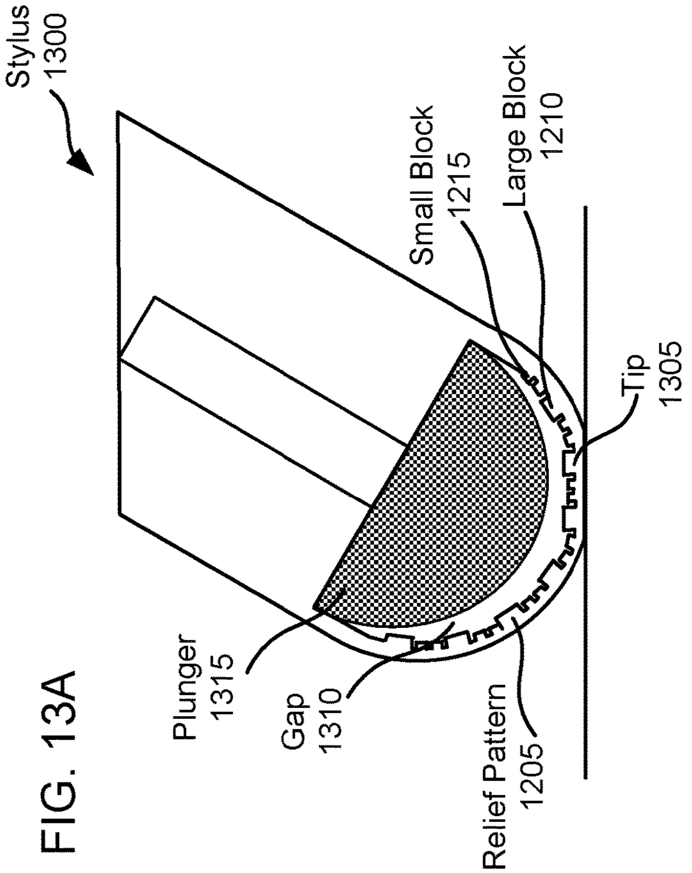
FIGS. 13A and 13C are cross-sectional views of a stylus with the relief pattern of FIG. 12, according to some embodiments.
Figure 13B:
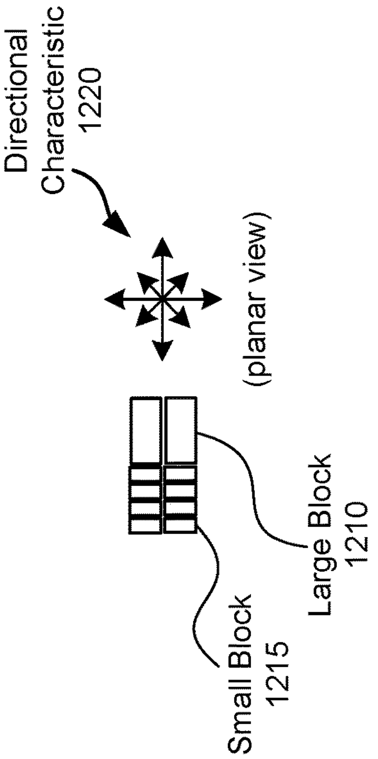
FIGS. 13B and 13D show the respective directional characteristics when the stylus of FIGS. 13A and 13C is in the default and the alternative states, according to some embodiments.
Figure 13C:
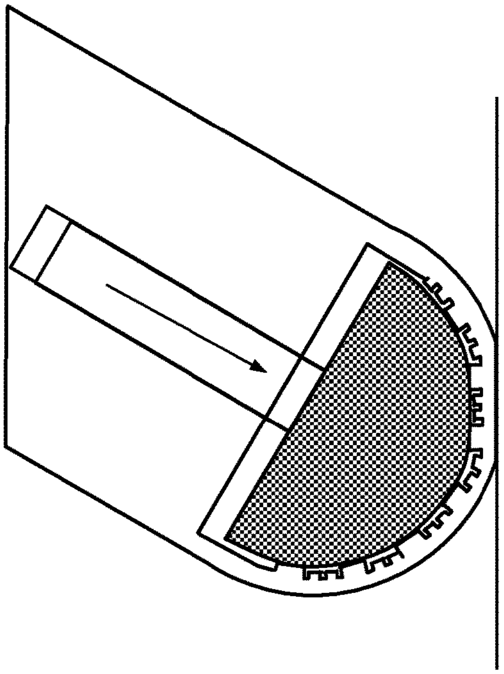

FIGS. 13A and 13C are cross-sectional views of a stylus 1300 with the relief pattern 1205 of FIG. 12, according to some embodiments. Specifically, the internal surface includes the alternating groups of large blocks 1210 and small blocks 1215. Although only the tip 1305 is shown, the stylus 1300 is similar to previously described styli with plungers and hollow tips. In FIG. 13A, the stylus 1300 is in the default state, and in FIG. 13C the stylus 1300 is in the alternative state. In the default state there is a gap 1310 between the plunger 1315 and the relief pattern 1205. In the alternative state, the plunger 1315 is in contact with the relief pattern 1205. Due to the large blocks 1210 being taller than the small blocks 1215, the plunger 1315 only contacts the top surfaces of the large blocks 1210 in the alternative state.

Figure 13D:
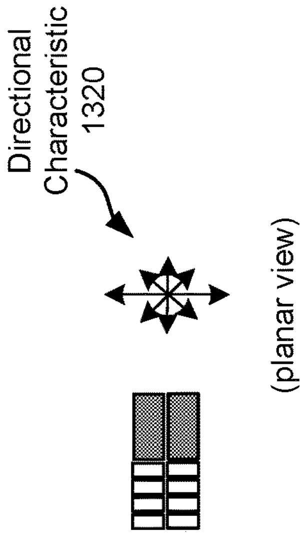

FIGS. 13B and 13D show the respective directional characteristics when the stylus is in the default and the alternative states. FIGS. 13B and 13D also each show a planar view of a group of large blocks 1210 and a group of small blocks 1215. In the default state, the relief pattern may disturb beams according to the directional characteristic 1220. However, in the alternative state the stylus 1300 has a different directional characteristic 1320 due to the plunger 1315 contacting the top surfaces of the large blocks 1210.

In the example of FIG. 13D, the plunger 1315 includes absorbent material. Thus, beams interacting with the large blocks 1210 may be absorbed by the plunger 1315, while beams that interact with the small blocks 1215 may not be absorbed by the plunger 1315. This creates a new directional characteristic 1320 where beams propagating parallel to the long edges of the small blocks are disturbed less than beams propagating in other directions. While the example of FIG. 13D includes a plunger 1315 with absorbent material, in other embodiments the plunger 1315 can include other materials to alter the directional characteristic.

Figure 14B:
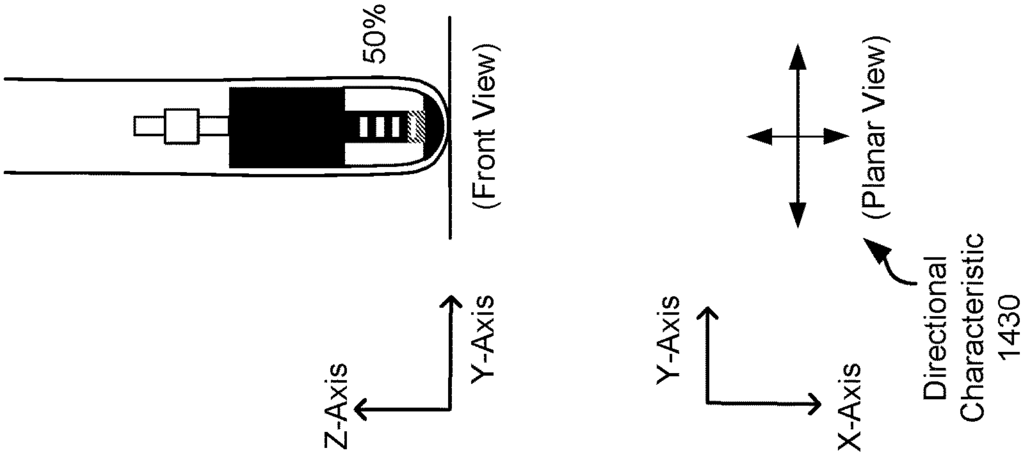
FIGS. 14A-14D are cross-sectional views of a stylus with gratings or grills, according to some embodiments.
Figure 14A:
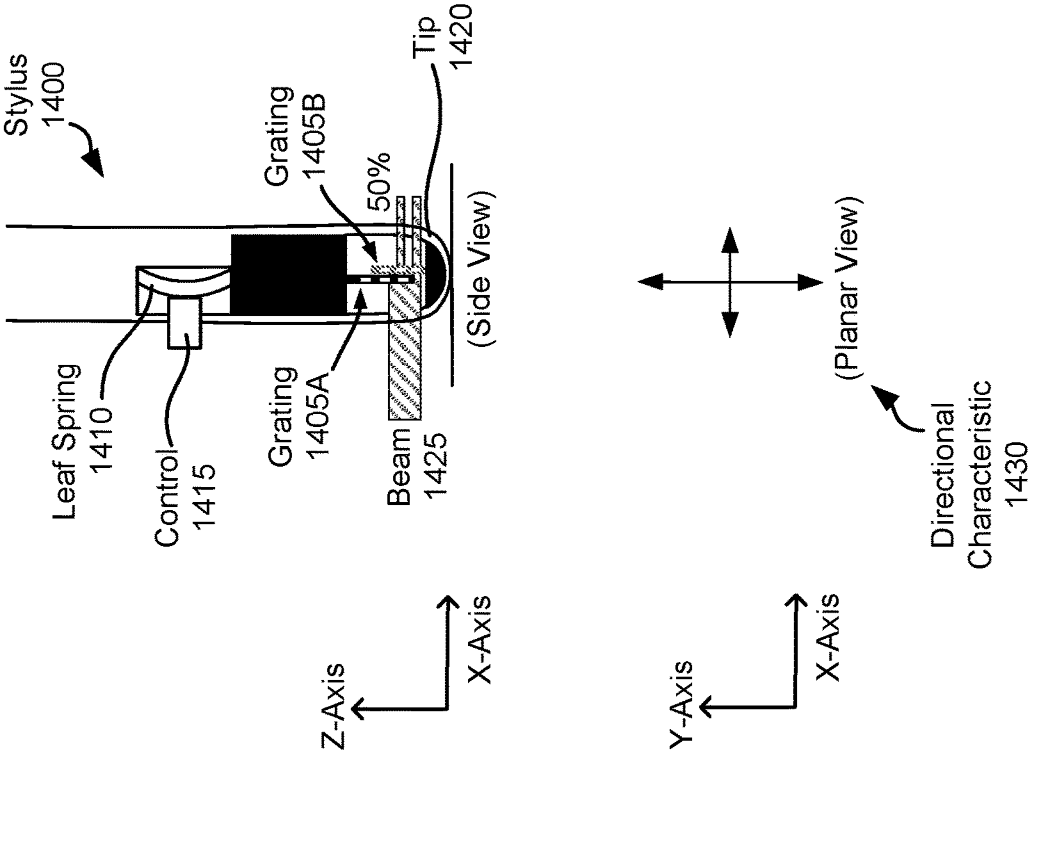
Figure 14D:
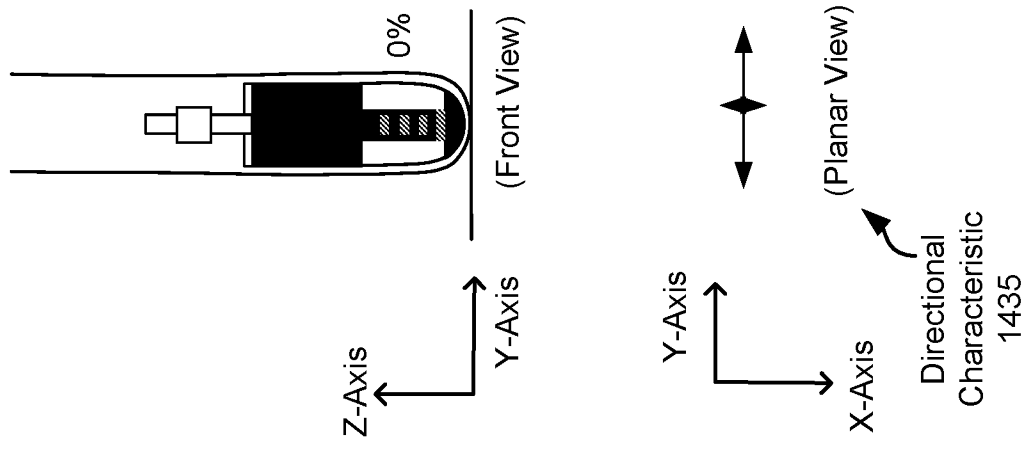
Figure 14C:
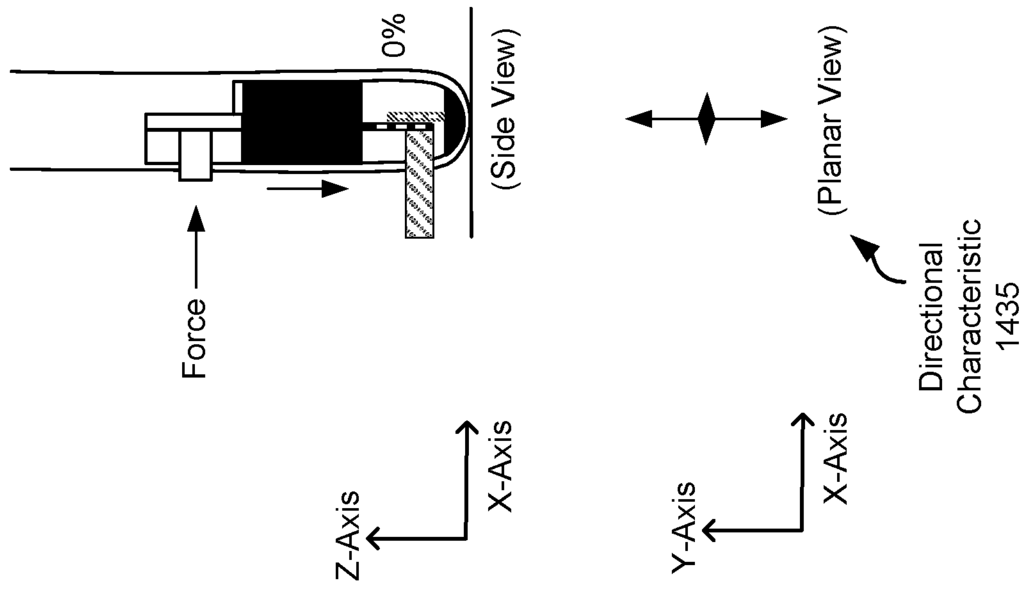

FIGS. 14A-14D are cross-sectional views of a control stylus 1400 with gratings or grills 1405, according to some embodiments. FIGS. 14A and 14B illustrate the stylus 1400 in a default state and FIGS. 14C and 14D illustrate the stylus 1400 in an alternative state. The stylus 1400 includes a top grating 1405A, a bottom grating 1405B, a leaf spring 1410, and a control 1415. The control 1415 is coupled to the leaf spring 1410 and the leaf spring 1410 is coupled to the top grating 1405A. The bottom grating 1405B is coupled to the tip 1420. The tip 1420 has a curved surface to allow any part of the tip 1420 to contact the touch surface. The tip 1420 is in contact with a touch surface and disturbs a beam 1425 propagating over the surface of the surface. The tip 1420 surrounds the gratings 1405 and is transparent (or partially transparent) to the beam 1425. The gratings 1405 are aligned with each other and designed to occlude portions of the beam incident on the gratings 1405.

The stylus 1400 may be changed from the default state to the alternative state or vice versa by applying a force to the control 1415. When the control 1415 is un-pressed, the gratings 1405 are aligned to disturb 50% of the beam 1425.

The disturbance percentage may depend on the aperture size and the alignment of the gratings 1425. When the control 1415 is pressed, the leaf spring 1410 shifts the top grating 1405A relative to the bottom grating 1405B. Thus, the gratings 1405 become aligned to disturb 100% (or at least more than the default state) of the incident beam 1425. This can be seen by comparing the directional characteristics 1430 and 1435. In some embodiments, the gratings 1405 are aligned differently than shown due to manufacturing defects or thermal expansion.

The gratings 1405 are planar and parallel. Thus, the gratings 1405 are wider along the y-axis (views from FIGS. 6B and 6D) than along the x-axis (views from FIGS. 6A and 6C).

Thus, regardless of the control position, beams propagating perpendicular to the grating plane (along the x-axis) may be disturbed more than beams propagating parallel to the grating plane (along the y-axis). This is also shown in the directional characteristics 1430 and 1435. While the gratings 1405 are planar and parallel, other grating configurations may be used in a control stylus. For example, a stylus includes a cylindrical grating inside another cylindrical grating. By engaging the control, one of gratings may be rotated to change the alignment of the gratings.

Since the beam transmission through the grating pair can range from maximum to minimum over the height of the grating features, the movement of the gratings 1405 can be relatively small for a large attenuation response. In some embodiments, the vertical spacing between apertures is the same as the aperture height. Thus, the aperture height may be the mechanical travel of the top grating 1405A to explore the full range of available attenuation. Apertures of 0.1 mm to 2 mm in height are typical for mechanically originated (e.g., stamped, cast, machined, etched, or laser-cut) gratings. Fine gratings (such as diffraction gratings) can have line spacings of <1 μm, so they offer the possibility of very short-travel.

The distinct directional characteristics 1430, 1435 may make the stylus 1400 and the stylus states distinguishable from other styli and other styli states. It can be seen from FIGS. 14A-14D that the stylus 1400 offers a distinctive directional characteristic which can be analyzed to indicate the state of the stylus. In either state, the directional characteristic can also be distinguished from a finger or opaque stylus (which show similar attenuation for beams approaching from any direction).

As previously mentioned, control styli can include more than two states. As an example, the stylus 1400 may include multiple states that correspond with different grating alignments (e.g., the stylus includes states that disturb 0, 25, 50, and 100% of the beam). In some embodiments, instead of distinct states, a control stylus includes a continuum of states. For example, the control 1415 may linearly control the alignment of the gratings 1405 (e.g., the control 1415 is a slider or roller). These embodiments may allow a user to have continuous control over a parameter. For example, in a digital drawing application, the drawn line width corresponds to the blocking percentage of the stylus 1400. Note that the continuum of states is limited by the resolution of the touch device 100. Due to this, the continuum may be a set of discrete states detectable by the touch device 100.

Figure 15A:
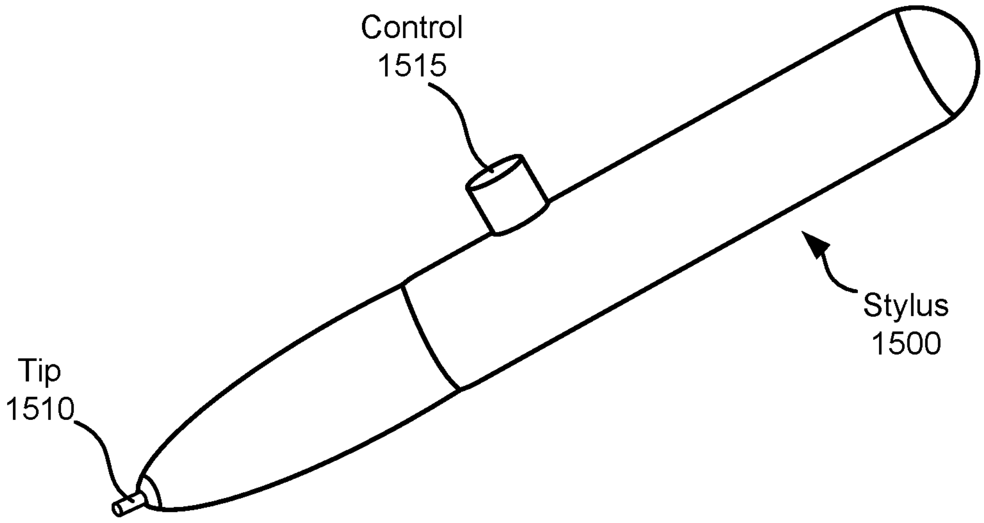
FIGS. 15A and 15B illustrate a stylus with a sleeve, according to some embodiments.
Figure 15B:
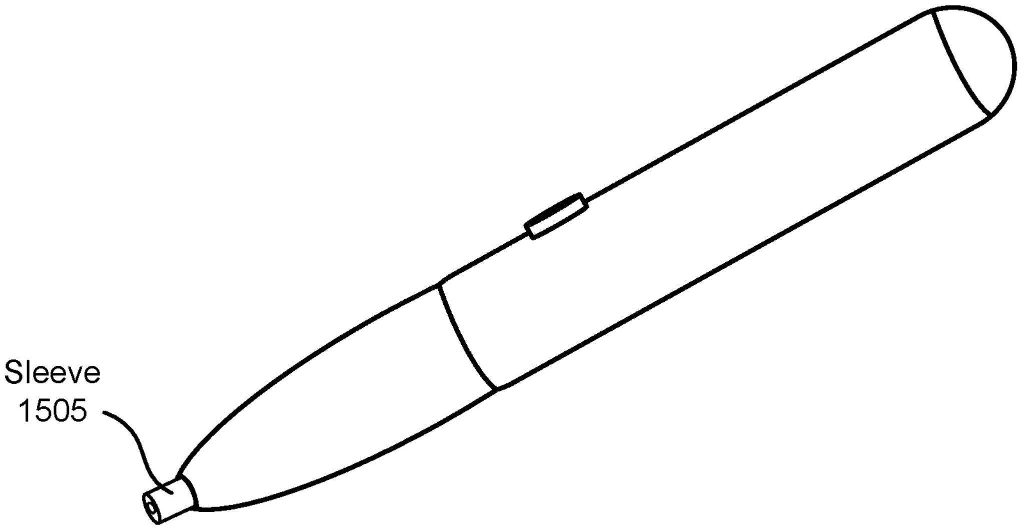

FIGS. 15A and 15B illustrate a control stylus 1500 with a sleeve 1505, according to some embodiments. The stylus 1500 includes a control 1515, a tip 1510, and an extendable sleeve 1505 that can surround the tip 1510. When the control 1515 is un-pressed, the sleeve 1505 is retracted so that only the tip 1510 contacts the touch surface. When the control 1515 is pressed, the sleeve 1505 extends to surround the tip so that both the tip 1510 and sleeve 1505 contact the touch surface. Since the sleeve 1505 is larger than the tip 1510, the stylus 1500 disturbs more beams (or a greater portion of a single beam) when the control 1515 is pressed. The tip 1510 and sleeve 1505 may each be partially transmissive or opaque. The stylus 1500 may also be used for frustrated TIR touch surfaces.

Compared to tips with curved surfaces (e.g., tip 1420), the embodiments of FIGS. 15A and 15B may be advantageous when beams pass close to the sensing surface. Styli with rounded tips tend to produce a lensing effect caused by the curved surface. Thus, a curved surface may disrupt beams near the surface differently than beams farther from the surface. However, the embodiment of FIGS. 15A-15B may be advantageous because the transmission profile of the tip 1510 and sleeve remain similar for beam heights ranging from the surface up to the end of the stylus body.

FIGS. 9A-15B illustrate various embodiments of control styli. Each figure can include more, fewer, or different components from those illustrated. For example, springs other than leaf springs may be used. In another example, a stylus may include a locking mechanism that keeps the control in a pressed or un-pressed state. In another example, a stylus includes a snap action spring mechanism that can give a sudden movement and tactile and audible indication of operation to the user when the user interacts with the control.

Figure 16:
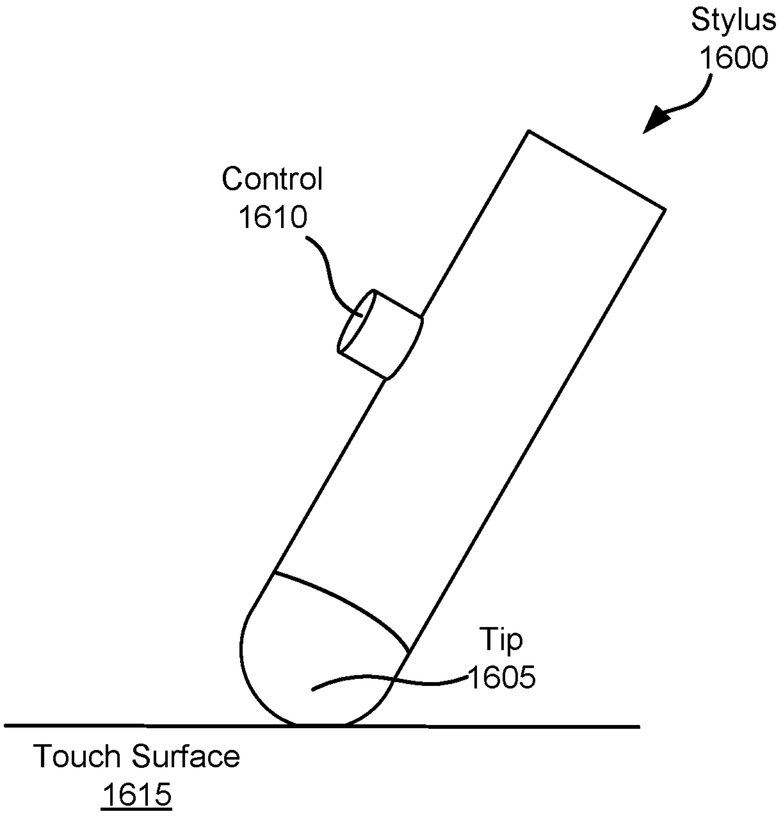
FIG. 16 is a stylus that illustrates underlying stylus concepts shared by FIGS. 9A-15B, according to an embodiment.

FIG. 16 is a control stylus 1600 that illustrates underlying concepts shared by FIGS. 9A-15B, according to an embodiment. The stylus 1600 is in contact with the touch surface 1615 and includes a control 1610 and a tip 1605. Since the stylus 1600 is in contact with the surface 1615, the stylus disturbs beams (not illustrated). By interacting with the control 1610, the optical properties of the tip 1605 can be modified such that beams disturbed by the stylus 1600 are disturbed differently. Additional approaches to change the optical properties of the tip 1605 (other than those described with reference to FIGS. 9A-15B) are described below.

The control stylus 1600 may include a polarizer. For example, in the alternative state, the polarizer is introduced into the tip 1605 such that disturbed beams may pass through the polarizer. In another example, the polarizer is present in both states and the polarizer is rotated when the stylus changes states. In another example, the gratings 1405 of stylus 1400 are replaced with polarizers (e.g., with orthogonal axes).

The stylus 1600 may include reflectors that reflect disturbed beams. In these embodiments, disturbed beams can be reflected from the tip 1605 at predetermined angle. For example, the tip 1605 includes two mirrors at an angle relative to each other. If the state of the stylus 1600 changes, the angle of the reflected beams may also change. Thus, if the origins of disturbed beams are known, the state and orientation of the stylus 1600 can be determined by determining the angle of the reflected beams.

The control stylus 1600 may include a photoluminescent material. The material can be exposed or masked by changing the stylus state. For example, the plunger 925 of stylus 900 or the tip 1510 of stylus 1500 is coated with a photoluminescent material. If the photoluminescent material is exposed, beams incident on the material may be absorbed and a beam with a new wavelength spectrum may be emitted. Thus, if beams with the new wavelength spectrum are detected, the state of the stylus can be determined.

The control stylus 1600 may include a lens. For example, the tip 1605 includes a lens. In the alternative state, the lens may be deformed or another lens may be introduced to the tip 1605. For example, by changing the state, transmission increases in one direction and decreases in another direction due to the lens deforming. Thus, the optical behavior of the stylus 1600 is modified in response to changing the state.

III. Processing Phase

In the processing phase 220 of FIG. 2, the transmission coefficients Tjk are used to determine the characteristics (e.g., location) of a touch event (also referred to as a touch point). For location characterization, different approaches and techniques can be used, including candidate touch points, line imaging, location interpolation, touch event templates, multi-pass processing and beam weighting. These approaches are described in further detail in U.S. Pat. No. 8,350,831, "Method and Apparatus for Detecting a Multitouch Event in an Optical Touch-Sensitive Device," which is incorporated herein by reference. These approaches are also described in further detail in U.S. Pat. No. 9,092,092, "Detecting Multitouch Events in an Optical Touch-Sensitive Device Using Touch Event Templates," which is incorporated herein by reference. The transmission coefficients Tjk may also be used to identify the touch object (e.g., finger, stylus, or other instrument) of a touch event. Various methods are described in further detail in U.S. Pat. No. 9,791,976, "Instrument Detection with an Optical Touch Sensitive Device," which is incorporated herein by reference.

If a touch event is a result of a stylus, the transmission coefficients Tjk may also be used to determine the state of the stylus. Various methods are described below with reference to FIG. 17.

Figure 17:
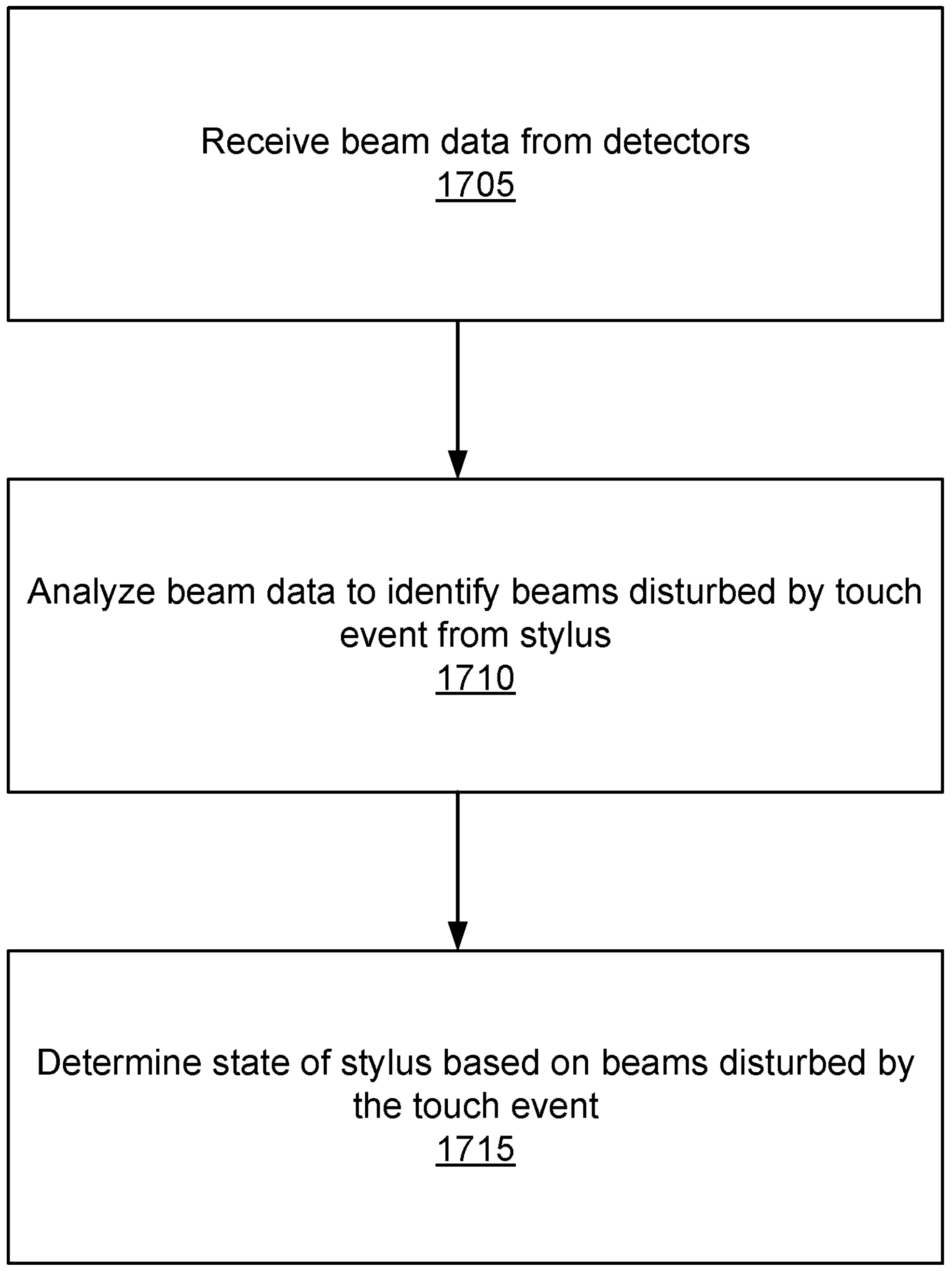
FIG. 17 is a flow chart illustrating a method for determining the state of a stylus in contact with a touch sensitive surface, according to an embodiment.

FIG. 17 is a flow chart illustrating a method for determining the state of a stylus in contact with a touch sensitive surface, according to an embodiment. The touch sensitive surface has emitters that emit beams and detectors that detect beams. The stylus is configured to switch between a default state and an alternative state, where the stylus disturbs beams in a different manner in the alternative state than the default state. The steps of the method may be performed in different orders, and the method may include different, additional, or fewer steps.

Beam data is received 1705 from the detectors. The beam data may be the transmission coefficients Tjk (also referred to as transmission values). The beam data is analyzed 1710 to identify beams disturbed by a touch event from the stylus. For example, the set of identified beams is determined by associating beams with a set of transmission coefficients Tjk affected by the touch event. In another example, the beam list is computed based on the distance between the beams and the touch location. In some embodiments, the list of beams affected by a touch event is precomputed for a given touch event location. For example, the beam list for the touch event under consideration can be retrieved once the location of the touch event is known.

The state of the stylus is determined 1715 based on the beams disturbed by the touch event. The state can be determined because each state of the stylus may disturb beams in a recognizable manner. In some embodiments, the state of the stylus is determined by computing a statistic of beam attenuation of the beams disturbed by a touch event. Beam attenuation is an inverse measure of beam transmission. In some embodiments, beam attenuation is defined as (1−Tjk). If the stylus increases transmission coefficients Tjk for beams (e.g., the stylus is an active stylus, includes a reflective element, or includes photoluminescent material) the state of the stylus can be determined by computing the (negative) beam attenuation (also referred to as beam enhancement) of the beams enhanced by the touch event.

In some cases, for OTS embodiments, a beam may be disturbed before a stylus contacts the touch surface (this may be referred to as a pre-touch event). For example, a user raises a stylus from the surface between touch events, however the height of the stylus between touch events is less than the height of a beam emitted above the surface. Thus, the user may unintentionally disturb beams with the stylus, and the touch device may incorrectly recognize a pre-touch event as a touch event.

To compensate for this, the controller may not recognize a touch event until contact between the touch object and the surface is confirmed. Contact confirmation can be determined from transmission coefficients Tjk. Beam disturbances (e.g., beam attenuation) from pre-touch events may be small compared to beam disturbances from touch events, since a larger portion of the stylus impedes beam paths when contact is made with the surface. As a result, stylus contact with the surface may be confirmed if beam attenuation is above a threshold value. Additionally, beam disturbances from pre-touches may vary differently than beam disturbances from touch events. For example, stylus contact is confirmed if beam disturbances vary in a range consistent with disturbances of a stylus type (e.g., attenuation values vary from 50% to 0%).

A. Stylus Changes Attenuation

Below is an example method for determining 1715 the state of a stylus based on the disturbed beams if the stylus attenuates beams differently in the default state than the alternative state. In this example, the stylus attenuates disturbed beams more in the alternative state than beams disturbed in the default state.

Transmission coefficients Tjk associated with disturbed beams are selected. An attenuation value is calculated based on the selected disturbed beams. As previously described, beam attenuation is an inverse measure of beam transmission (e.g., 1−Tjk). The attenuation values may be based on a mean, median, weighted average, sum, root mean square, or percentile analysis of the transmission coefficients Tjk (e.g., the mean of (1−Tjk)). The weights for calculating a weighted average may be based the distance between a beam and the center of the contact area of a touch point (e.g., beams closer to the center of the contact area are given larger weights). Instead of considering all transmission coefficients Tjk, subsets of beam values may be sampled, for example, to increase accuracy or to reduce the computational load. For example, beams may be grouped according to beam direction (e.g., beams within an angular range) or beam attenuation (e.g., beams with attenuation values above a specified threshold). Furthermore, outliers may be removed prior to calculating the beam statistics. For example, the largest and smallest beam attenuation values are removed. These values may correspond to crosstalk between touches in multitouch scenarios.

The state of the stylus is determined by analyzing the calculated attenuation value. If the attenuation value is above a threshold, this may indicate that the beams are strongly attenuated, and thus the stylus is in the alternative state. If the attenuation value is below the threshold, this may indicate that the beams are attenuated less, and thus the stylus is in the default state. In some embodiments, a second threshold that is below the threshold may be used to confirm the beams are disturbed. For example, if the attenuation value is below the second threshold, it may be unclear if the beams are disturbed by a touch event. In some embodiments, additional thresholds may be used to distinguish different styli. An additional upper limit threshold may be applied to determine whether the object is more attenuating than a control stylus. If so, the touch object may be an opaque stylus or another touch object.

B. Stylus Changes Size

Below is an example method for determining 1715 the state of a stylus based on the disturbed beams if the stylus can change size. In this example, the stylus becomes wider (and thus disturbs more beams) in the alternative state than the default state. An example stylus of this kind is described with reference to FIGS. 15A and 15B.

The optical paths along the touch surface are determined (or retrieved if already known) for beams disturbed by the stylus. A dimension indicative of the size of the stylus (e.g., diameter, surface area, etc.) is determined based on the optical paths of the disturbed beams. The state of the stylus is determined based on the dimension value. If the dimension value is below a threshold, it is determined that the stylus is in the default state. If the dimension value is above the threshold, it is determined that the stylus is in the alternative state. An additional upper limit threshold may be applied to determine whether the object is wider than a control stylus. If so, the touch object may be another touch object (e.g., a finger or a palm).

C. Stylus Changes Beam Wavelengths

Below is an example method for determining 1715 the state of a stylus based on the disturbed beams if the stylus includes a wavelength filter. In this example, a set of emitters emits a first set of beams with first peak wavelength (e.g., 940 nm) and another set of emitters emits a second set of beams with a second peak wavelength (e.g., 850 nm). In this example, the stylus filters the first set of beams in the alternative state, and the stylus equally disturbs both sets of beams in the default state.

Transmission coefficients Tjk of disturbed beams are associated with the emitters that emitted them (if not already known). Since the wavelengths of each emitter may be known, the peak wavelength of each beam may be determined. A first attenuation value for beams with the first peak wavelength is calculated, and a second attenuation value for beams with the second peak wavelength is calculated. The attenuation values may be calculated in a similar manner as described in Section III.A. If the first and second attenuation values are within a threshold range, both sets of beams are similarly attenuated, and it is determined that the stylus is in the default state (e.g., because no wavelength filtering occurred). If the first attenuation value is more than the threshold range above the second attenuation value, this indicates that the stylus is in the alternative state because wavelength filtering occurred for the first set of beams. In some embodiments, the stylus includes an additional state where the second set of beams are filtered. In these embodiments an additional check may be performed to determine if the attenuation is greater for the second set of beams.

D. Stylus Changes Directional Characteristic

Below is an example method for determining 1715 the state of a stylus based on the disturbed beams if the alternative state has a different directional characteristic than the default state.

A set of expected transmission coefficients Tjk are determined. The set is determined for a given stylus state and orientation on the touch surface. Multiple sets of expected transmission coefficients Tjk can be determined for different stylus states and orientations. These sets may be determined before the touch event is detected. A quality of fit metric is calculated by comparing the transmission coefficients Tjk of the disturbed beams with a set of expected transmission coefficients Tjk. The quality of fit metric (also referred to as a goodness of fit metric) may be determined from a regression analysis or any other appropriate statistical model test. In some cases, quality of fit metric is a correlation value. A quality of fit metric may be calculated for each set of expected transmission coefficients Tjk. Based on the quality of fit metrics, a set of expected transmission values is selected. For example, the set of expected transmission coefficients Tjk with the best quality of fit metric is selected. Once a set of expected transmission coefficients Tjk is selected, the state of the stylus is determined from the stylus state associated with the set. In some embodiments, the sets of expected transmission coefficients Tjk may be calculated using a computational model. The model can include the effects on the transmission coefficients Tjk for each state and orientation of the stylus. The model may be based on real touch data (e.g., from a prototype stylus on a testing touch device). In some embodiments, the model is generated by human inference based on the stylus design. For example, the model is a mathematical model that maps the tip orientation to beam transmission coefficients Tjk. In some embodiments, the model is derived from sample data acquired from representative example stylus tips and a touch device 100 (or a comparable optical measuring device).

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein.

What is claimed is:

1. A system comprising:
- a touch sensitive surface and emitters and detectors, the emitters producing optical beams that propagate across the touch sensitive surface and are received by the detectors;
- a passive stylus configured to disturb a portion of the optical beams when in contact with the touch sensitive surface, the stylus including a control configured to change the stylus between a first state and a second state, wherein the stylus disturbs the portion of the optical beams differently in the second state than the first state, wherein the stylus comprises:
  - a hollow tip configured to disturb the portion of the optical beams when the hollow tip is in contact with the touch sensitive surface; and
  - a plunger, wherein in the first state the plunger is separated from an internal surface of the hollow tip and in the second state the plunger is coupled to the internal surface of the hollow tip; and
- a controller configured to determine the state of the stylus based on the optical beams received by the detectors.

2. A passive stylus configured to contact a touch sensitive surface of a touch system, the touch system having emitters that produce optical beams that propagate across the touch sensitive surface and are received by detectors, wherein the stylus disturbs a portion of the optical beams, the stylus having a control configured to change the stylus between a first state and a second state, wherein the stylus disturbs the portion of the optical beams in a different manner in the second state than the first state such that the touch system can determine the state of the stylus, wherein the stylus comprises:

a hollow tip configured to disturb the portion of the optical beams when the hollow tip is in contact with the touch sensitive surface; and a plunger, wherein in the first state the plunger is separated from an internal surface of the hollow tip and in the second state the plunger is coupled to the internal surface of the hollow tip.

3. The system of claim 2, wherein the control includes at least one of: a button, a switch, a lever, a rotary dial, a band, a rotating section of a body of the stylus, a roller, or a slider.

4. The system of claim 2, wherein the hollow tip is configured to disturb the portion of the optical beams in the first state, and the stylus further comprises:

a sleeve configured to surround the hollow tip when the control is activated to change the stylus to the second state.

5. The system of claim 2, wherein the first state and the second state are the only two states of the stylus.

6. The system of claim 2, wherein the first state and the second state are states in a set of three or more states, wherein the control is configured to change the stylus to one of the three or more states that include the first state and the second state.

7. The stylus of claim 2, wherein the plunger conforms to the internal surface of the hollow tip in the second state.

8. The stylus of claim 2, wherein the hollow tip comprises transmissive material or partially transmissive material, wherein at least some disturbed beams are coupled into the hollow tip when the hollow tip is in contact with the touch sensitive surface.

9. The stylus of claim 2, wherein the plunger comprises material that absorbs or attenuates optical beams incident on the plunger.

10. The stylus of claim 2, wherein the internal surface of the hollow tip comprises a relief pattern.

11. The stylus of claim 10, wherein the relief pattern includes light absorbing material.

12. The stylus of claim 11, wherein the relief pattern includes repeating structures.

13. The stylus of claim 2, wherein the stylus further comprises a reflector, and wherein in the second state the portion of the optical beams are disturbed such that a disturbed optical beam is reflected by the reflector towards a detector.

14. The stylus of claim 2, wherein the stylus further comprises a wavelength filter and wherein at least some of the portion of optical beams are filtered by the wavelength filter in the second state such that a disturbed optical beam has a wavelength spectrum different than a wavelength spectrum of the optical beam when it was emitted from an emitter.

15. The stylus of claim 2, wherein the stylus further comprises a polarizer and at least some of the disturbed beams are polarized by the polarizer in the second state.

16. The stylus of claim 2, wherein the stylus further comprises two gratings that are aligned, wherein the gratings are aligned differently in the first and second states such that disturbed beams are disturbed in the different manner in the second state than the first state.

17. The stylus of claim 2, wherein the stylus further comprises a photoluminescent material such that the material emits a new optical beam when a disturbed optical beam is absorbed by the material.

18. A method of determining a state of a passive stylus in contact with a touch sensitive surface, the touch sensitive surface having emitters that emit optical beams and detectors that detect optical beams, the stylus configured to switch between a first state and a second state, the stylus disturbing a portion of the optical beams in a different manner in the second state than the first state, the stylus comprising a hollow tip configured to disturb the portion of the optical beams when the hollow tip is in contact with the touch sensitive surface, and a plunger, wherein in the first state the plunger is separated from an internal surface of the hollow tip and in the second state the plunger is coupled to the internal surface of the hollow tip, the method comprising:

receiving beam data from the detectors;

analyzing the beam data to identify the portion of the optical beams disturbed by a touch event from the stylus; and determining the state of the stylus based on the portion of the optical beams disturbed by the touch event.

* * * * *